United States Patent
Kami et al.

(10) Patent No.: US 7,856,572 B2
(45) Date of Patent: Dec. 21, 2010

(54) INFORMATION PROCESSING DEVICE, PROGRAM THEREOF, MODULAR TYPE SYSTEM OPERATION MANAGEMENT SYSTEM, AND COMPONENT SELECTION METHOD

(75) Inventors: Nobuharu Kami, Tokyo (JP); Takashi Yoshikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 580 days.

(21) Appl. No.: 11/719,488

(22) PCT Filed: Nov. 16, 2005

(86) PCT No.: PCT/JP2005/021003

§ 371 (c)(1),
(2), (4) Date: May 16, 2007

(87) PCT Pub. No.: WO2006/054573

PCT Pub. Date: May 26, 2006

(65) Prior Publication Data

US 2009/0150711 A1    Jun. 11, 2009

(30) Foreign Application Priority Data

Nov. 17, 2004    (JP) .............................. 2004-333778

(51) Int. Cl.
*G06F 11/00* (2006.01)
(52) U.S. Cl. ........................................................ 714/3
(58) Field of Classification Search ................. 714/3
See application file for complete search history.

(56) References Cited

U.S. PATENT DOCUMENTS

| | | | | |
|---|---|---|---|---|
| 5,504,670 A | * | 4/1996 | Barth et al. | 700/5 |
| 6,591,373 B1 | * | 7/2003 | Ardis et al. | 714/7 |
| 6,651,182 B1 | * | 11/2003 | Chang et al. | 714/3 |
| 7,284,244 B1 | * | 10/2007 | Sankaranarayan et al. | 718/104 |
| 7,316,020 B2 | * | 1/2008 | Raja et al. | 718/104 |
| 2001/0037473 A1 | | 11/2001 | Matsuura et al. | |
| 2004/0250157 A1 | * | 12/2004 | Barga et al. | 714/2 |
| 2005/0066217 A1 | * | 3/2005 | Barga et al. | 714/2 |

(Continued)

FOREIGN PATENT DOCUMENTS

JP    7-73061    3/1995

(Continued)

OTHER PUBLICATIONS

Service Availability Application Interface Specification, System Description, pp. 1-36, SAI-AIS-A 01.01, Service Availability Forum.

(Continued)

*Primary Examiner*—Christopher S McCarthy
(74) *Attorney, Agent, or Firm*—Dickstein Shapiro LLP

(57) ABSTRACT

An information processing device includes: storage means containing component information on the components constituting a system having a predetermined function; and processing means for calculating a combination of components necessary for constituting a system required for a service according to the component information, calculating risk information as information on the risk that a physical failure affects the service request for the combination of the components and/or fragment information as information on the deflection degree of the use condition of the components, and ranking the selected component combinations according to a predetermined policy, calculated list information and/or the fragment information.

15 Claims, 32 Drawing Sheets

U.S. PATENT DOCUMENTS

2008/0288810 A1* 11/2008 Bailey et al. .................. 714/3

FOREIGN PATENT DOCUMENTS

| JP | 11-345219 | 12/1999 |
|---|---|---|
| JP | 2001-306349 | 11/2001 |
| JP | 2002-259147 | 9/2002 |
| JP | 2002-323986 | 11/2002 |
| JP | 2003-507817 | 2/2003 |

OTHER PUBLICATIONS

S. Knight, et al., "Virtual Router Redundancy Protocol," Network Working Group Request for Comments: 2338, Category: Standard Track, Apr. 1998.

* cited by examiner

FIG. 17

ID INFORMATION 1700

VIRTUAL RESOURCE ID: V***
UNIT PHYSICAL RESOURCE ID: B***
VIRTUAL SERVICE GROUP ID: VSG***
VIRTUAL NODE ID: VSG*VN*
VIRTUAL SERVICE UNIT ID: VSG*VS*
VIRTUAL COMPONENT ID: VSG*VN*VC***
REDUNDANT RESOURCE MEMBER ID: VSG*VN*VC* M*

ROUTER REDUNDANCY EXAMPLE

FIG. 27

| SHELF | COMPONENT PASS | COMPONENT KIND | PROTECT |
|---|---|---|---|
| Sh1 | Sh1B1 | R1 | OFF |
|  | Sh1B2 | R1 | OFF |
|  | Sh1B3 | R1 | OFF |
|  | Sh1B4 | R1 | OFF |
|  | Sh1B5 | R1 | OFF |
|  | Sh1B6 | R1 | OFF |
|  | Sh1B7 | R1 | OFF |
|  | Sh1B8 | R1 | OFF |
|  | Sh1B9 | R1 | OFF |
| Sh2 | Sh2B1 | R1 | OFF |
|  | Sh2B2 | R1 | OFF |
|  | Sh2B3 | R1 | OFF |
|  | Sh2B4 | R1 | OFF |
|  | Sh2B5 | R1 | OFF |
|  | Sh2B6 | R1 | OFF |
|  | Sh2B7 | R1 | OFF |
|  | Sh2B8 | R1 | OFF |
|  | Sh2B9 | R1 | OFF |
| Sh3 | Sh3B1 | R1 | OFF |
|  | Sh3B2 | R1 | OFF |
|  | Sh3B3 | R1 | OFF |
|  | Sh3B4 | R1 | OFF |
|  | Sh3B5 | R1 | OFF |
|  | Sh3B6 | R1 | OFF |
|  | Sh3B7 | R1 | OFF |
|  | Sh3B8 | R1 | OFF |
|  | Sh3B9 | R1 | OFF |
| Sh4 | Sh4B1 | R1 | OFF |
|  | Sh4B2 | R1 | OFF |
|  | Sh4B3 | R1 | OFF |
|  | Sh4B4 | R1 | OFF |
|  | Sh4B5 | R1 | OFF |
|  | Sh4B6 | R1 | OFF |
|  | Sh4B7 | R1 | OFF |
|  | Sh4B8 | R1 | OFF |
|  | Sh4B9 | R1 | OFF |

FIG. 28

| SERVICE GROUP | ID | REDUNDANCY | DEVICE | SHELF | COMPONENT NUMBER (TYPE 1) |
|---|---|---|---|---|---|
| 1 | 1 | 2+1 | SEPARATE DEVICE | SEPARATE SHELF | 3 |
| 2 | 2 | 1+1 | SEPARATE DEVICE | SEPARATE SHELF | 2 |
| 3 | 3 | 1+1 | SEPARATE DEVICE | IDENTICAL SHELF | 2 |
| 4 | 4 | 1+1 | SEPARATE DEVICE | SEPARATE SHELF | 3 |
| 5 | 5 | 1+1 | SEPARATE DEVICE | SEPARATE SHELF | 2 |
| 6 | 6 | 1+1 | SEPARATE DEVICE | SEPARATE SHELF | 2 |
| 7 | 7 | 1+1 | SEPARATE DEVICE | SEPARATE SHELF | 2 |

FIG. 29

| POLICY ID | PREFERENCE CALCULATION | DIVISION | FRAGMENT UPPER-LIMIT |
|---|---|---|---|
| 1 | ONLY RISK | INFINITY | 3 |
| 2 | ONLY FRAGMENT | INFINITY | 3 |
| 3 | RISK→FRAGMENT | INFINITY | 3 |
| 4 | FRAGMENT→RISK | INFINITY | 3 |

COMBINATION 2

| | SHELF 1 | SHELF 2 | SHELF 3 | SHELF 4 |
|---|---|---|---|---|
| SHARED RISK | 2 | 4 | 1 | 1 |
| FAILURE RATIO | 1 | 1 | 1 | 1 |
| RISK PARAMETER | 2 | 4 | 1 | 1 |

| RISK PARAMETER AVERAGE ave | 2 |
|---|---|
| RISK PARAMETER VARIANCE var | 2 |

| FRAGMENT PARAMETER AVERAGE ave | 0.333333 |
|---|---|
| FRAGMENT PARAMETER VARIANCE var | 0.238095 |

COMBINATION 3

| | SHELF 1 | SHELF 2 | SHELF 3 | SHELF 4 |
|---|---|---|---|---|
| SHARED RISK | 4 | 4 | 1 | 1 |
| FAILURE RATIO | 1 | 1 | 1 | 1 |
| RISK PARAMETER | 4 | 4 | 1 | 1 |

| | |
|---|---|
| RISK PARAMETER AVERAGE ave | 2.5 |
| RISK PARAMETER VARIANCE var | 3 |

| | |
|---|---|
| FRAGMENT PARAMETER AVERAGE ave | 0.4 |
| FRAGMENT PARAMETER VARIANCE var | 0.257143 | ns on one platform. As compared with the discrete
INFORMATION PROCESSING DEVICE, PROGRAM THEREOF, MODULAR TYPE SYSTEM OPERATION MANAGEMENT SYSTEM, AND COMPONENT SELECTION METHOD

APPLICABLE FIELD IN THE INDUSTRY

The present invention relates to an information processing device, a program thereof, and a modular type system operation management system.

BACKGROUND ART

With a wide-range spread of Internet in recent years, an electronic business manage system employing a computer and a network has taken root as a business foundation or a social infrastructure, and mission criticality with a high level is required for an Internet related system. For this, as a rule, a scheme is carried out for incorporating such a redundant configuration of making a switchover to a preliminary resource without suspending the business even at the time of occurrence of a failure.

So as to provide redundancy, there exists the technique of internally dualizing the device to set one thereof for a active device and the other for a standby device, thereby to make provision for a component-level failure within the device, constituting a redundant group from a plurality of the devices for a purpose of making provision for a failure of a device unit such as a power failure in addition hereto, and assuming that one of them is an active resource and the others are a standby resource. However, in this moment, this device group has to be virtualized so that it appears to be a single device from a view of a user who uses it and receive a service. As one technique, a dedicated protocol for redundancy is generally used for inter-device redundancy. For example, with a router described in FIG. 20, internal dualization 4011 is pre-set for resources 401 and 402 inside a router 405, and a protocol for redundancy among a plurality of routers described in Non-patent document 1, i.e. VRRP (Virtual Router Redundancy Protocol) V10, is employed to provide redundancy between the devices, thereby making it possible to assume the foregoing redundant configuration. In this moment, one virtual router 407 appears to be existent from a view of a user who uses this router.

Further, dualizing the device internally against a component failure within it, which requires only a switchover in the inside without changing a physical device itself, is more desirable than switching over the device itself as a failure recovery technique; however providing a large number of dualized devices for a purpose of redundancy gives rise to dualization of the standby resource, which means that a resource utilization efficiency is 50% at maximum with active:standby=1:1, and thus, it is difficult to incorporate such a configuration of N+1 redundancy in which one redundant resource is shared by N. Further, putting discrete devices side by side consumes a space, and is wasteful. Thereupon, instead of employing discrete devices having a function fixed, modularized unit resources are mounted onto a unified platform to perform a necessary setting (hereinafter, referred to as a service), whereby necessary devices are virtually formed without restraint, which makes it possible to curtail a space that is consumed, to enhance an efficiency of resource utilization, to enhance a flexibility of a utilization mode, or the like. Further, by employing a stacking technology, it is also possible to cause the discrete devices to sit astride a plurality of shelves that are physically separate, thereby to virtualize them as resources on one platform. As compared with the discrete devices having various settings such as the setting of hardware performed already at the time of delivery, the devices in the foregoing service that requires the setting of hardware etc. necessitates the more complicated management business such as the setting of the device. With the technology of virtualizing the resource, however, a scheme for facilitating the setting for constituting the virtual device is carried by providing a virtual resource pool, registering the physical resources into the corresponding virtual resource pool based upon properties, for example, a kind and a performance, and concealing information that is not necessary is concealed in selecting the resource. For example, in FIG. 25, a physical resource 906 having a shelf 904 and unit physical resources 905 is classified according to attributes such as its performance and kind, and registered into a virtualized pool 901 after concealing information that is unnecessary for a resource user, for example, a physical arrangement. The resource user does not directly set information of the physical resource 906, but sets it based upon information of the virtual resource within the virtual resource pool, and management software manages a relation between a virtual resource 903 and a unit physical resource 905, or the like, whereby the user does not have to alter the setting, but it is enough that it alters only related information that the management software keeps also in a case where an alteration to the physical resources that is accompanied by an alteration to the system is made, or the like.

By logically setting the virtualized resource, in dualizing the virtual resource (hereinafter, referred to as a component) constituting the above-mentioned service, it is possible for the components within a plurality of the services incorporating the redundant configuration to share, for example, one virtual resource, thus enabling a resource utilization efficiency to be enhanced. For this, for example, in a case where routers, each of which has the component dualized inside it as mentioned above, are set as a certain service, and yet a plurality of the routers assume the redundant configuration, it is also possible to logically set "standby" components of respective router as a plurality of the separates devices while sharing a certain resource, to realize intra-device dualization while realizing an effective utilization of the resource, or the like. Further, the redundant configuration can be incorporated with the external redundancy protocol such as the VRRP as inter-device dualization.

Further, as a redundant configuration, there exist, for example, configurations of 2N redundancy, N+M redundancy, and N-Way redundancy as specified by a redundant framework of AIS (Application Interface Specification) described in Non-patent document 2. In each of FIG. 21 to FIG. 23, one example of the redundant configuration is shown. A service group is defined as an aggregation for providing a certain service, in which a service instance, a node, and a service unit exist. The so-called service instance is a logical entity of the service that should be provided, the node is a logical entity signifying a gathering of the physical resources from which some resource is provided, and the service unit is a logical entity existing on the above node. A plurality of the service units, each of which becomes an "active" one or a "standby" one depending upon the redundant configuration that is employed, are caused to pre-relate to the above service instances, which designates the "standby" service unit for a failure recovery when the "active" service unit becomes useless due to a failure etc. For example, FIG. 21 shows an example of the 2N (N=1) redundancy setting on discrete nodes in which one service instance 502 exists for a service group 501, a service unit 503 on a node 505 and a service unit 504 on a node 506 are defined, respectively, and the service unit 503 has been set for an "active" one and the service unit 504 for a "standby" one. Each of FIG. 22 and FIG. 23 shows an example of a configuration of 2N (N=3) redundancy.

Herein, various redundant configurations can be designated depending upon which redundant configuration is incorporated for the service units, and which node each of them is arranged for. The node, which signifies an aggregation of the physical resources, shares a risk. For this, when a node failure occurs, the service unit set thereon becomes useless.

Non-patent document 1: RFC2338
Non-patent document 2: SAI-AIS-A.01.01, P67

DISCLOSURE OF THE INVENTION

Problems to be Solved by the Invention

However, configuring/setting redundancy in and outside the service employing the unit physical resources on the foregoing platform gives rise to the following points at issue.

The first point at issue is that a risk management in the entirety of the system becomes difficult in a case of employing a large number of the unit physical resources to form a plurality of the services over the system in various redundant configurations. The reason is that a risk management in the discrete devices is comparatively distinct for a manager who performs the service management such as the physical resource and the redundant configuration constituting the service; however a risk classification by a failure location of the physical resource becomes equivocal when physical information (location information, power wiring information, etc.) is involved.

The second point at issue is that, by virtualizing the resource, the risk management in the entirety of the system becomes difficult in forming a plurality of the services over the system in various redundant configurations. The reason is that virtualizing the resource makes it possible to enhance a freedom degree of setting the service, and to use the resources within the management system without paying attention to its physical location; however a risk classification by a failure location of the physical resource becomes equivocal for a manager who performs the service management such as the management of the physical resource constituting the service and the redundant configuration when physical information (location information, power wiring information, etc.) is involved in a case of employing the virtualized resources to set the service. For this, in a case of setting the above-mentioned redundant configuration, it is necessary to subdivide the virtual resource pool from a viewpoint of the physical risk, and provide its information for the manager, who makes its risk classification based upon the detailed information of the resource; however the manager itself has to set the redundant configuration based upon the information because the risk classification has not been abstracted. For this, when the system becomes enlarged/complex, its complexity augments acceleratively, which makes the management business very difficult.

The third point at issue is that there is a possibility that the performance necessary for the required service cannot be attained in some case, and an effective utilization efficiency of the resource declines in some case. The reason is that a deflection (hereinafter, referred to as a fragment) in a situation of utilizing the resource occurs while repeating an alteration to the setting of the system/installation of additional systems, which gives rise to a possibility that, when the unit companions that are physically far away from each other as a matter of fact are collected for constituting the service, the performance declines due to a delay etc. during its time in some case, and contrarily, in a case of following a policy that the service is not used unless the performance thereof is attained, the resource that cannot be utilized is produced. In particular, it is desirable from a viewpoint of a management purpose that the identical devices are located as closely as possible in a physical sense as well, and the reason is that the fragment management acceleratively increases in complexity as the system is enlarged/complicated, which forces the manager who performs the service management to bear a burden.

The fourth point at issue is that there is a possibility that, in a case of providing redundancy, quick execution of the management by man's power becomes impossible substantially due to a complexity of the management business when the system is of large scale. The reason is that the management business becomes so complex that it is substantially impossible to search for the system configuration optimal for the required service from a viewpoint of the risk management and the fragment management because the number of the resources that has to be managed in the large-scale system is enormous, and besides, a service collected logically and a relation with constituent physical resources thereof have to be managed.

Thereupon, the present invention has been accomplished in consideration of the above-mentioned problems, and an object thereof is to provide an information processing device of being capable of, by providing a technology of automating the risk management and the fragment management in a system having a plurality of services, facilitating the setting of the service and its redundant configuration, alleviating a burden that the manager performing a service management bears, and setting the service also in an alteration to the setting that is accompanied by a system update etc. without paying attention to its alteration, a program thereof, a modular type system operation management system, and a component selection method.

Means to Solve the Problem

A first invention for solving the aforementioned problems is an information processing device, characterized in comprising: storage means for filing component information on components for constituting a system having a predetermined function; and processing means for calculating a combination of the components necessary for constituting a system required for a service based upon said component information, calculating risk information, being information on a risk that a physical failure affects a service request, and/or fragment information, being information on a deflection degree of a use situation of the component, for this combination of the components, and ranking the selected combinations of the components based upon a predetermined policy, the calculated risk information, and/or fragment information.

The second invention for solving the above-mentioned problems is characterized in, in the above-mentioned first invention, that said processing means comprises means for calculating a statistic of the risk in each combination of the components as the risk information.

The third invention for solving the above-mentioned problems is characterized in, in the above-mentioned second invention, that said processing means comprises means for calculating an average and/or a variance, being a statistic of the risk in each combination of the components, as the risk information.

The fourth invention for solving the above-mentioned problems is characterized in, in the above-mentioned first to third inventions, that said processing means comprises means for calculating a statistic of the fragment in each combination of the components as the fragment information.

The fifth invention for solving the above-mentioned problems is characterized in, in the above-mentioned fourth invention, that said processing means comprises means for calculating an average and/or a variance, being a statistic of the fragment in each combination of the components, as the fragment information.

The sixth invention for solving the above-mentioned problems is characterized in, in one of the above-mentioned first to fifth inventions, that the component information that is filed into said storage means is information of a physical resource.

The seventh invention for solving the above-mentioned problems is characterized in, in one of the above-mentioned first to sixth inventions, that: the component information that is filed into said storage means is comprised of physical resource information of the physical resource, and virtualized resource information of a virtualized resource that is obtained by virtualizing and componentizing said physical resource, said virtualized resource information being caused to relate to said physical resource information; and said processing means comprises means for, based upon said component information, calculating a combination of the components with one virtualized resource assumed to be one component.

The eighth invention for solving the above-mentioned problems is a program of an information processing device, characterized in causing the information processing device to function as means for calculating a combination of components necessary for constituting a system required for a service based upon component information on the component for constituting a system having a predetermined function, calculating risk information, being information on a risk that a physical failure affects a service request, and/or fragment information, being information on a deflection degree of a use situation of the component, for this combination of the components, and ranking the selected combinations of the components based upon a predetermined policy, the calculated risk information, and/or fragment information.

The ninth invention for solving the above-mentioned problems is characterized in, in the above-mentioned eighth invention, that the risk information is a statistic of the risk in each combination of the components.

The tenth invention for solving the above-mentioned problems is characterized in, in the above-mentioned ninth invention, that the risk information is an average and/or a variance, being a statistic of the risk in each combination of the components.

The eleventh invention for solving the above-mentioned problem is characterized in, in one of the above-mentioned eighth to tenth inventions, that the fragment information is a statistic of the fragment in each combination of the components.

The twelfth invention for solving the above-mentioned problem is characterized in, in the above-mentioned eleventh invention, that the fragment information is an average and/or a variance, being a statistic of the fragment in each combination of the components.

The thirteenth invention for solving the above-mentioned problem is characterized in, in one of the above-mentioned eighth or twelfth inventions, that said component is a physical resource.

The fourteenth invention for solving the above-mentioned problem is characterized in, in one of the above-mentioned eighth to thirteenth inventions, that said component is a resource that is obtained by virtualizing the physical resource.

The fifteenth invention for solving the above-mentioned problem is an information processing device, characterized in comprising: storage means for filing component information on components for constituting a system having a predetermined function; and means for calculating a combination of the components necessary for constituting a system required for a service based upon said component information.

The sixteenth invention for solving the above-mentioned problem is a program of an information processing device, characterized in causing the information processing device to function as means for calculating a combination of components necessary for constituting a system required for a service based upon component information on the component for constituting a system having a predetermined function.

The seventeenth invention for solving the above-mentioned problem is a modular type system operation management system, characterized in comprising: a physical resource constituting a modular type system, being an object of management, said physical resource being connected to a network; a terminal for transmitting information acquisition request data, setting request data, and policy data of a setting item or an operational data item that said physical resource provides, said terminal being connected to the network; and a controller connected to the network: comprising: physical resource information, being information of said physical resources; virtual resource information having information extracted of the item for referencing or changing the setting/operational data item that said physical resources provides; information of a virtual service group that is configured of said virtual resources, said information being virtual service group space information having information extracted/processed of the item for referencing or changing the setting/operational data item that said virtual resources provides; and policy information having processing information described in referencing or changing the setting/operational data item that said virtual resources provides; and including means for: making a reply to a request for setting said physical resources or virtual resources that are transmitted from said terminal; calculating a solution by an optimal calculation based upon said virtual resource information and policy information; performing an optimal setting of the virtual resource service group based upon this solution; preparing/managing said virtual service group space information; transmitting it to said terminal, and further transmitting information to said terminal responding to an information acquisition request for each of said information.

The eighteenth invention for solving the above-mentioned problem is characterized in, in the above-mentioned seventeenth invention, that said controller comprises means for, for said setting request, employing said physical resource information or said virtual resource information to calculate risk information, being information on a risk that a physical failure affects said setting request, and preparing/managing said virtual service group space information.

The nineteenth invention for solving the above-mentioned problem is characterized in, in the above-mentioned seventeenth or eighteenth inventions, that said controller comprises means for, for said setting request, employing said physical resource information or said virtual resource information to calculate fragment information, being a deflection degree of a use situation of the resources, and preparing/managing said virtual service group space information.

The twentieth invention for solving the above-mentioned problem is characterized in, in one of the above-mentioned seventeenth to nineteenth inventions, that said controller comprises: a physical resource information database for filing information of said physical resources; physical resource management means for performing managements such as read/write, information update, and monitoring of said physical resource database; a virtual resource information database for filing information of said virtual resources; virtual resource management means for performing managements such as read/write, information update, and monitoring of said virtual resource database; a virtual service group space information database for filing information of said virtual service group space; virtual service group management means for performing managements such as read/write, information update, and monitoring of said virtual service group space information database; a policy information database for filing information of said policy; and policy management means for performing managements such as read/write, information update, and monitoring of said policy information database.

The twenty-first invention for solving the above-mentioned problem is characterized in, in one of the above-mentioned seventeenth to twentieth inventions, that said controller comprises communication means for transmitting/receiving necessary data via the physical resource and the network.

The twenty-second invention for solving the above-mentioned problem is characterized in, in one of the above-mentioned seventeenth to twenty-first inventions, that: said controller comprises: means for, at the time of occurrence of the failure, detecting abnormality by receiving an alarm signal from the physical resources, or inspecting a state by periodic signal transmission from the controller; and means for notifying said detection of abnormality to said physical resource management means, said virtual resource management means, and said virtual service group management means; and said physical resource management means, said virtual resource management means, and said virtual service group management means update information of the database that each of them manages base upon said detection of abnormality.

The twenty-third invention for solving the above-mentioned problem is characterized in, in one of the above-mentioned seventeenth to twenty-second inventions, that: said physical resource management means, said virtual resource management means, and said virtual service group management means update information of the database that each of them manages at the time of altering a system such as additional installation and an alteration; said controller comprises means for re-calculating said optimization calculation automatically or with a trigger by a manager's command based upon said updated information, and performing an optimal setting of the virtual service group.

The twenty fourth invention for solving the above-mentioned problem is a component selection method of selecting components necessary constituting a system required for a service, characterized in calculating a combination of the components necessary for a system required for a service based upon component information the components constituting a system having a predetermined function; calculating risk information, being information on a risk that a physical failure affects a service request, and/or fragment information, being information on a deflection degree of a use situation of the component, for this combination of the components; and ranking the selected combinations of the components based upon a predetermined policy, the calculated risk information, and/or fragment information.

Upon explaining an operation of the present invention by making a reference to FIG. 26, there exist component information 11, being information of components constituting a plurality of modular type system each of which is an object of management in a management system, a service request 12, being a request for setting/altering a service in the system, and policy information 13 set in advance as an input of an information processor 10.

The system required for the service is configured of service units, each of which is configured of components. The so-called component is a concept including not only a single physical resource necessary for constituting the service unit required for the service, but also a virtual physical resource group having one function that has a plurality of different physical resources employed and combined.

At first, with the above-mentioned input data, combinations of the components that enable the service request to be satisfied are selected based upon the combination information 11. Risk information and fragment information are obtained for each of these combinations of the components.

The so-called risk information, which is information on the risk that a physical failure affects the service request, is one obtained by numerically evaluating information as to a degree of the risk. Further, the so-called fragment information is one obtained by, in the combination of the components satisfying the service request, numerically evaluating information on the deflection degree of the use situation of the components constituting it. Additionally, in calculating the risk information and the fragment information, the information that is used for calculation may be weighted, thereby to reflect a priority degree etc. into it.

And, a reference to the calculated risk information and fragment information is made based upon the policy information 13, thereby to rank the combinations of the components.

Effects of the Invention

The first effect lies in a point that, in setting the device (virtual device) and its redundancy configuration from physical resources, and virtual resources obtained by virtualizing these physical resources, the complex risk management that is accompanied by the system alteration, and the management of the fragment of the use situation of the resources are concealed from the service manager who performs the service management.

The reason is that providing a virtual service group space 4005 described in FIG. 18 to assign a virtual service group 4006, a virtual service unit 4007, a virtual component 4009, and a virtual node 4008, which have the risk and the fragment optimized, to a service group 4011, a service unit 4012, a component 4013, and a node 4010 of a service request 4014, respectively, makes it possible to automatically set an optimal relation between the virtual service group layer and the virtual resource or the physical resource even though the optimal state alters due to additional installation and an alteration of the system, etc.

The second effect lies in a point that the optimal resource can be selected from among candidates for the setting satisfying the service at a most desirable risk or fragment without forcing the service manager to bear a burden.

The reason is to have a function of extracting candidates for the resource setting satisfying a request from a usable resource group, accompanied by a service manager's request, performing a risk calculation to select an optimal configuration from among a search space that is configured of its candidates, assigning its result to the virtual service group, and registering/managing it.

The third effect lies in a point that it is possible to select the optimal resource at a desirable fragment without forcing the service manager to bear a burden while realizing the required performance and redundant configuration described in the service request, to facilitate the management of the resources constituting the virtual device by collecting them into one lump if circumstances permit, and further, to enhance the use efficiency of the resources.

The reason is to have a function of, for the above-mentioned virtual service group space, extracting candidates for the resource satisfying a request from a usable resource group similarly to the foregoing, optimizing the fragment with the fragment operation, assigning its result to the virtual service group, and registering/managing it.

The fourth effect lies in a point that it is possible to automatically perform the desirable setting by simultaneously taking both of two management matters each having a relation to the other, being the fragment management and the risk management, into consideration.

The reason is that, in deciding the setting of the virtual service group, the calculation management can be performed with an appropriate processing flow according to the management policy.

BRIEF DESCRIPTION OF THE DRAWINGS

FIG. 17 shows one example of ID information that is used in the example 1.

FIG. 27 is a view having the details of the component information shown.

FIG. 28 is a view having the details of the service request shown.

FIG. 29 is a view having the details of the policy information shown.

DESCRIPTION OF NUMERALS

1 terminal
2 network means
3 controller
4 physical resource

BEST MODE FOR CARRYING OUT THE INVENTION

An embodiment of the present invention will be explained.

Figure 26:
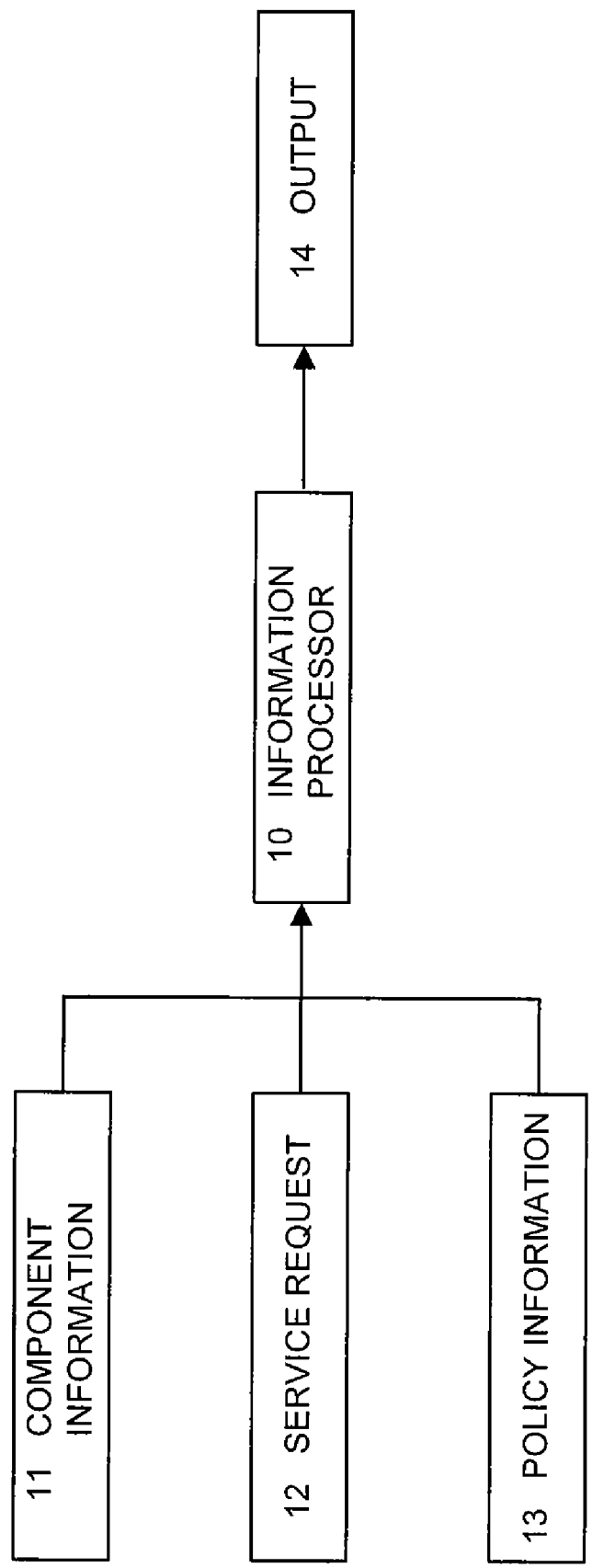
FIG. 26 is a conceptual view of the embodiment.

Upon making a reference to FIG. 26, this system has component information 11, being information of components constituting a plurality of modular type systems each of which is an object of management in a management system, a service request 12, being a request for setting/altering the service for the system, and policy information 13 set in advance as an input of information processor 10. The information processor 10 uses the components described in the component information 11, selects all combinations of the components satisfying the required service, and sorts these selected combinations according a policy. And, this sorting result is assumed to be an output 14.

In the following explanation, it is assumed that the system required for the service is configured of service units. In a case where the system required for the service is a switch device of the redundant system, for example, the "active" switch device becomes one service unit, and the "standby" switch device also becomes one service unit.

In addition hereto, it is assumed that the service unit is configured of components. The so-called component is a concept including not only a single physical resource necessary for constituting the service unit required for the service, but also a virtual physical resource group having one function that has a plurality of different physical resources employed and combined. In the following explanation, for a purpose of easily understanding the present invention, the component is explained as one physical resource having a single function that is filed into a slot of a shelf, and the details of its component information are shown in FIG. 27. In FIG. 27, the case that the number of the kind of the component (physical resource) is only one, and the number of the self is four is shown.

Next, the service request will be explained.

In this embodiment, as shown in FIG. 28, one service request is comprised of seven service groups in all of a service group 1 to a service group 7.

Redundancy of each service group in FIG. 28 indicates a type of redundancy for assigning the service units, and for example, 1+1 indicates one "active" service unit and one "standby" service unit. Herein, the so-called service unit, which is a unit satisfying a function of the required service as mentioned above, is configured of a plurality of the components or a single component (physical resource), and specifically, one service unit is configured by collecting the components of which number is equal to the component number shown in FIG. 28. For example, the service unit of the service group 1 is configured of three components.

A so-called device in FIG. 28 indicates whether to handle the service units specified by the redundancy as one device, or a separate device, and for example, two kinds of an identical device (handing all service units as one device) and a separate device (handing all service units as a separate device, respectively) can be specified.

A shelf in FIG. 28, which describes how to arrange the service units, for example, arrangement of each service unit into a separate self or respective units into an identical self, or the like, includes an identical shelf (accommodation of the service units into an identical shelf), a separate shelf (accommodation of each service unit into a separate shelf), or the like.

A component number in FIG. 28 is the number of the components necessary for constituting one service unit. In this example, it is simply the number because the component has only type 1; however in a case where the attribute (a kind and a performance of the component, or the like) exists in plural, the number of the required resources for respective attributes is described.

In the service request shown in FIG. 28, for example, the service group 2 is described in such a manner that it has two service units each of which is configured by using two components of a component attribute type 1, each of the service units is filed into a separate shelf, and one service unit is assigned as an "active" one, and the other as a "standby" one.

Next, the policy information will be explained.

The so-called policy information is information as to which condition is employed to prioritize an aggregation of the combinations of the components satisfying the foregoing service request. Risk information or fragment information is employed as information for this prioritization in the present invention. The so-called risk information, which is information on the risk that the physical failure affects the service request in the combination of the components satisfying the service request, is one obtained by numerically evaluating information as to a degree of the risk that the combination of the components has. Further, the so-called fragment information is one obtained by, in the combination of the components satisfying the service request, numerically evaluating information on the deflection degree of the use state of the components constituting it.

One example of such policy information is shown in FIG. 29. A preference calculation in FIG. 29 describes a calculation in the information processor 10, and only risk, which indicates only a risk calculation, signifies neglect of a fragment. Likewise, only fragment signifies neglect of a risk. Risk→fragment signifies that the risk is firstly calculated, and thereafter, the component of which the fragment is low is selected. Fragment→risk signifies that the operation is opposite hereto.

Further, division designates how an average and a variance of a risk parameter and a fragment parameter are processed, and for example, in a case where the division number is 100, and the number of the combinations that are searched is 1000, the parameters are classified into 100 sections in the ascending order of the average value, and the parameters belonging to an identical section are regarded as one having an identical risk in terms of the average value, respectively, and sorted in the ascending order of the variance value within its section. Infinity signifies that the parameters are sorted in terms of the average value within the scope of significant figures. That is, the average value takes priority of the variance. Besides, for example, the designation such that higher 10% of the parameters are regarded to be one having an identical risk, respectively, and after dividing the parameters firstly in terms of the variance, they are sorted in terms of the average value is also possible. Additionally, herein, the so-called risk parameter is a value obtained by multiplying a shared risk by a failure ratio of the component. Further, the so-called shared risk is the number of the service unit that is "active" within one shelf, and the larger this number, the larger the number of the service unit that are affected in a case where one shelf has failed, thus the higher the risk. Further, the so-called fragment parameter is a value signifying a deflection of the use situation of the components constituting the service unit.

A fragment upper-limit indicates the number of the shelves that may be ridden so as to form one device in the possible combinations. For example, in constituting the service unit of which the component number is four, if the fragment upper-limit is set to three, it is not permitted that one component is taken out from each of four shelves to constitute the service unit.

Further, a concept of weighting the risk parameter and the fragment parameter may be introduced so as to reflect the priority degree of the service etc. For example, in a case of sharing the shelf with the service group having a high priority degree, a configuration is made so as to affix a weighting factor having the priority degree reflected to the service units belonging to its service group (for example, to multiply a priority degree thereof by the numerical figure of 1 or more). Further, the shared risk may be multiplied by the failure ratio of the shelf as a weighting factor.

An example of a specific operation that is performed in the information processor 10 under the foregoing condition is shown.

At first, with the above-mentioned input data, a combination of the components that enables the service request to be satisfied is selected based upon the component information 11.

Herein, it is assumed that there exists four combinations of the components satisfying the conditions of the service group 1 to the service group 7, and the schematic view of each combination is shown in FIG. 30 to FIG. 33, respectively. Additionally, in FIG. 30 to FIG. 33, the numerical figure of each component indicates which service group the above component is used in, and the region encircled by a bold line indicates "active". Further, for facilitating an explanation, each of the weight and the failure ratio signifying a priority degree is assumed to be 1 uniformly.

Figure 30:
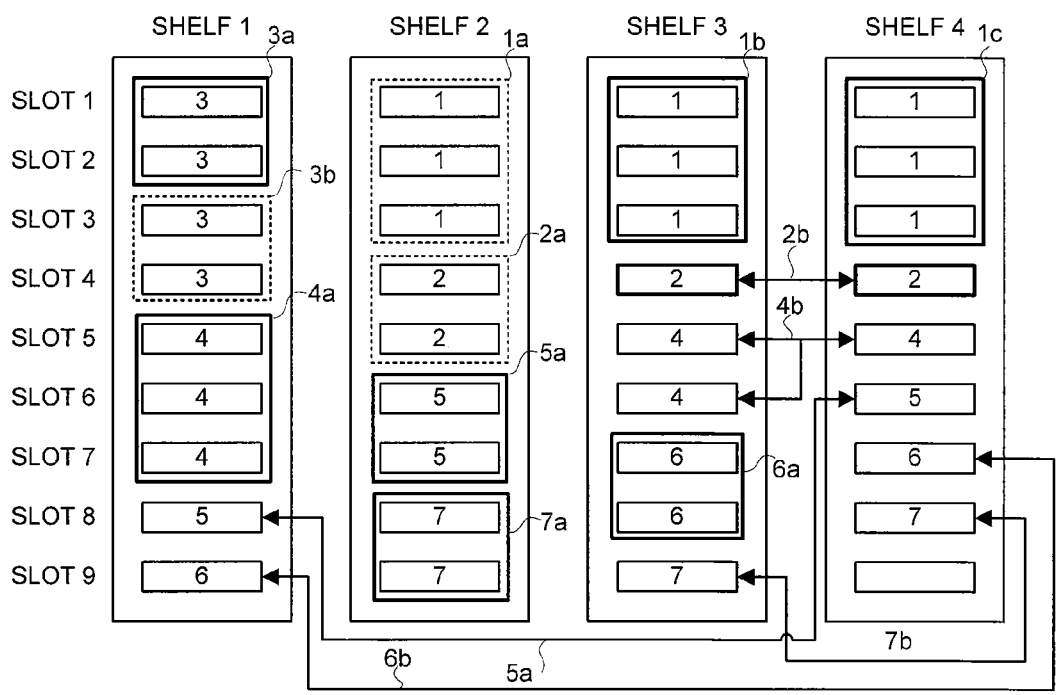
FIG. 30 is a schematic view of a combination 1 of the components.
Figure 31:
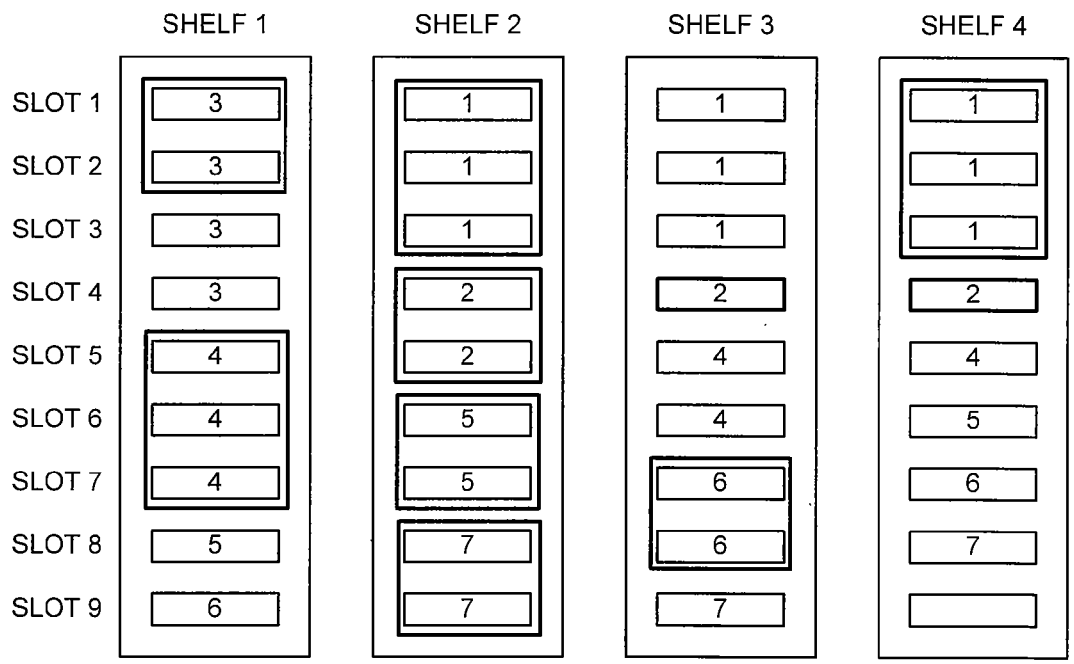
FIG. 31 is a schematic view of a combination 2 of the components.
Figure 32:
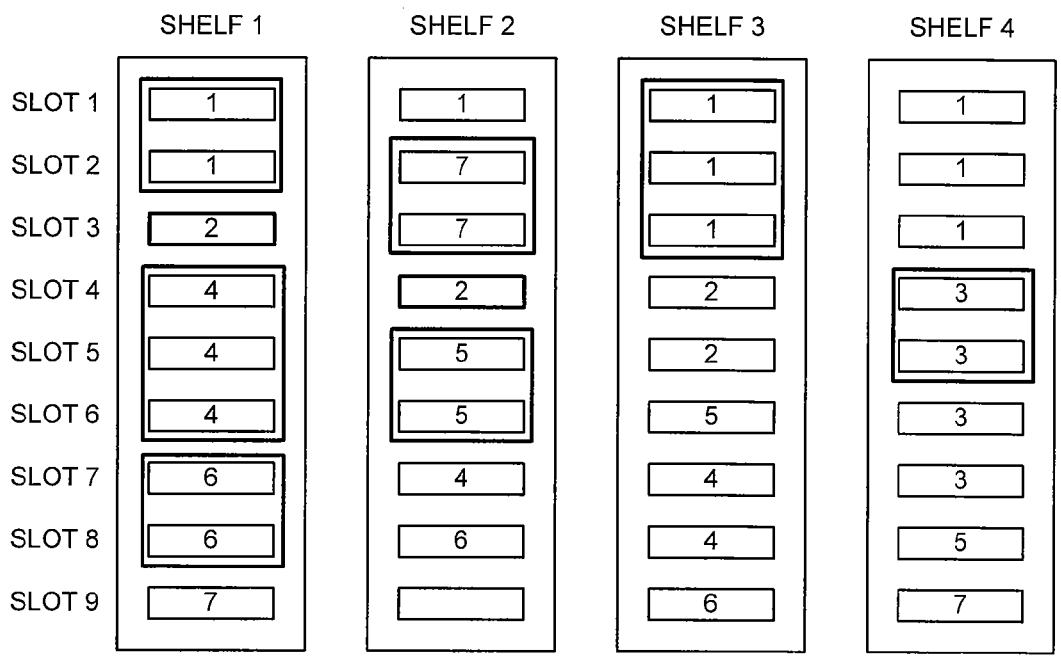
FIG. 32 is a schematic view of a combination 3 of the components.
Figure 33:
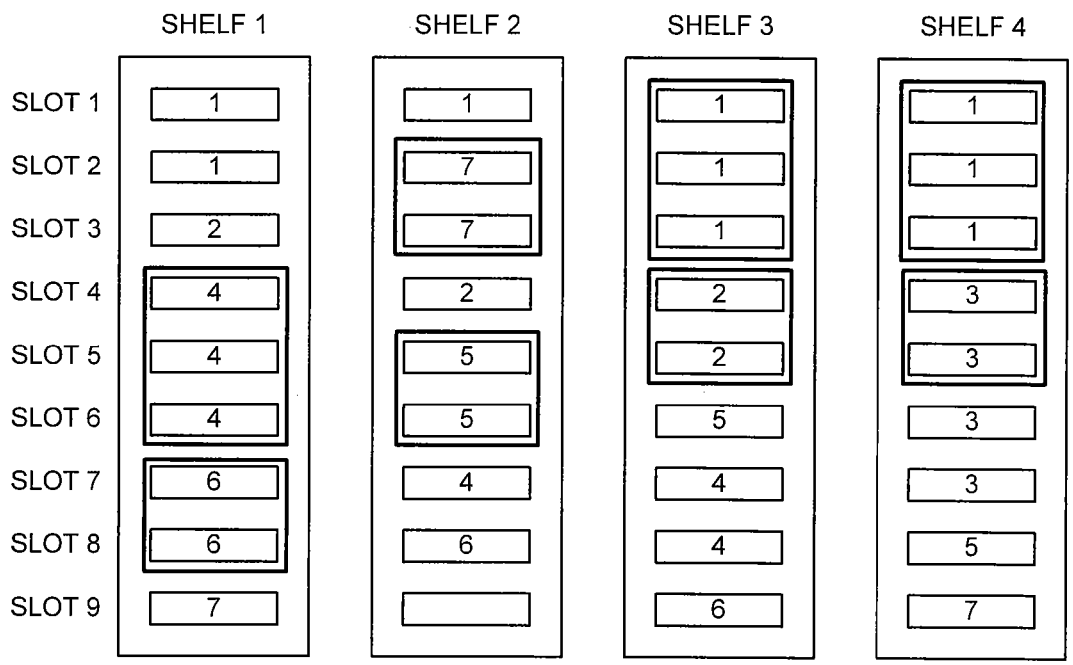
FIG. 33 is a schematic view of a combination 4 of the components.

Herein, a combination 1 shown in FIG. 30 is employed to explain a specific calculation method of the risk information and the fragment information.

At first, with the risk information, the risk parameter is calculated.

In a shelf 1, each of service units 3a and 4a is "active", so the shared risk is 2, and each of the weight and the failure ratio signifying the priority degree is 1 uniformly, so the risk parameter becomes 2 (=2×1×1). In a shelf 2, each of service units 5a and 7a is "active", so the shared risk is 2, and each of the weight and the failure ratio signifying the priority degree is 1 uniformly, so the risk parameter becomes 2 (=2×1×1). In a shelf 3, each of service units 1b, 2b and 6a is "active", so the shared risk is 3, and each of the weight and the failure ratio signifying the priority degree is 1 uniformly, so the risk parameter becomes 3 (=3×1×1). In a shelf 4, each of service units 1c and 2b is "active", so the shared risk is 2, and each of the weight and the failure ratio signifying the priority degree is 1 uniformly, so the risk parameter becomes 2 (=2×1×1).

Herein, upon assuming that the risk parameter of each shelf is $x_i$ and the shelf number is n, an average of the risk parameters behaves like $$ave = \bar{x} = \frac{1}{n}\sum_{i=1}^{n} x_i \qquad \text{[Numerical equation 1]}$$

whereby, an average of the risk parameters of the combination 1 becomes 2.25.

Further, a variance of the risk parameters behaves like $$var = \frac{1}{n-1}\sum_{i=1}^{n} (x_i - \bar{x})^2 \qquad \text{[Numerical equation 2]}$$

whereby, a variance of the risk parameters of the combination 1 becomes 0.25.

The average and variance of the risk parameters obtained in such a manner are assumed to be risk information of the combination 1.

Next, with the fragment information, the fragment parameter is calculated.

The fragment parameter is a numerical value signifying a deflection of the components constituting the service units of each of one service group.

For example, the components constituting the service unit 1a of the service group 1 of the combination 1 are accommodated into an identical shelf, so the fragment parameter of the service unit 1a is 0(=1−1). Likewise, the components constituting the service unit 1b of the service group 1 of the combination 1 are accommodated into an identical shelf, so the fragment parameter of the service unit 1b is 0(=1−1). Likewise, the components constituting the service unit 1c of the service group 1 of the combination 1 are accommodated into an identical shelf, so the fragment parameter of the service unit 1c is 0(=1−1).

In a similar method, the components constituting the service unit 2a of the service group 2 of the combination 1 are accommodated into an identical shelf, so the fragment parameter of the service unit 2a is 0(=1−1). The components constituting the service unit 2b sit astride two shelves and are accommodated, so the fragment parameter of the service unit 2b is 1(=2−1).

In a similar method, the components constituting the service unit 3a of the service group 3 of the combination 1 are accommodated into an identical shelf, so the fragment parameter of the service unit 3a of the service group 3 is 0(=1−1). The components constituting the service unit 3b of the service group 3 are accommodated into an identical shelf, so the fragment parameter of the service unit 3b is 0(=1−1).

In a similar method, the components constituting the service unit 4a of the service group 4 of the combination 1 are accommodated into an identical shelf, so the fragment parameter of the service unit 4a is 0(=1−1). The components constituting the service unit 4b sit astride two shelves and are accommodated, so the fragment parameter of the service unit 4b is 1(=2−1).

In a similar method, the components constituting the service unit 5a of the service group 5 of the combination 1 are accommodated into an identical shelf, so the fragment parameter of the service unit 5a is 0(=1−1). The components constituting the service unit 5b sit astride two shelves and are accommodated, so the fragment parameter of the service unit 5b is 1(=2−1).

In a similar method, the components constituting the service unit 6a of the service group 6 of the combination 1 are accommodated into an identical shelf, so the fragment parameter of the service unit 6a is 0(=1−). The components constituting the service unit 6b sit astride two shelves and are accommodated, so the fragment parameter of the service unit 6b is 1(=2−1).

In a similar method, the components constituting the service unit 7a of the service group 7 of the combination 1 are accommodated into an identical shelf, so the fragment parameter of the service unit 7a is 0(=1−). The components constituting the service unit 7b sit astride of two shelves and are accommodated, so the fragment parameter of the service unit 7b is 1(=2−1).

Herein, upon assuming that the fragment parameter of each service unit is $f_i$ and the service unit number is n, an average of the fragment parameters behaves like $$ave = \bar{f} = \frac{1}{n}\sum_{i=1}^{n} f_i \qquad \text{[Numerical equation 3]}$$

whereby, an average of the fragment parameters of the combination 1 becomes 0.333333.

Further, a variance of the fragment parameter behaves like $$var = \frac{1}{n-1}\sum_{i=1}^{n} (f_i - \bar{f})^2 \qquad \text{[Numerical equation 4]}$$

whereby, a variance of the fragment parameters of the combination 1 becomes 0.238095.

The average and variance of the fragment parameters obtained in such a manner are assumed to be fragment information of the combination 1.

With the combinations 2, 3 and 4 as well, the risk information and the fragment information are calculated in a method similar to the foregoing method. These results are described in FIG. 31 to FIG. 33.

Next, the ranking of each combination of the components based upon the risk information and the fragment information will be explained.

(1) Only Risk

In case of the policy ID=1, only the risk calculation is designated, and the division indicates infinity, so the combinations of the components are sorted in terms of the risk parameter average.

Upon assuming that the risk parameter of each shelf is $y_i$, and the shelf unit number is n, an average of the risk parameters behaves like $$ave = \bar{y} = \frac{1}{n}\sum_{i=1}^{n} y_i \qquad \text{[Numerical equation 5]}$$

Thus, the average of the risk parameters of each combination is one shown in each figure, and the risk lowers in the order of combination 4<combination 2<combination 1<combination 3. Herein, the averages of the combination 4 and the combination 2 are identical to each other, whereby the combination 4 of which a variance of the risk parameter is small has a lower risk.

(2) Only Fragment

In case of the policy ID=2, only the fragment operation is designated and the division indicates infinity, so the combinations of the components are sorted in terms of the fragment parameter average.

That is, the fragment lowers in the order of combination 1=combination 2<combination 3=combination 4. Herein, for example, the averages as well as the variances of the combination 4 and the combination 2 are identical to each other, respectively, whereby they rank equally with only the fragment.

(3) Risk→Fragment

The order has been already decided in the risk calculation, so a result is identical to the case of (1). Herein, for example, in a case of having set the policy that, if a risk parameter average ave is identical and a risk parameter variance var is 2 or less, it is assumed that the combination has an identical risk, each of the combination 4 and the combination 2 has an identical risk, whereby the order of combination 2<combination 4<combination 1<combination 3 is yielded due to a difference in an average of the fragments.

(4) Fragment→Risk

The order of (2) has been obtained from a result of the fragment operation, and for example, the combination 1 and the combination 2 rank equally; however in a case of setting that the combinations is compared by means of the risk parameter average ave obtained from the risk calculation, the order of combination 1<combination 2<combination 4<combination 3 is yielded. However, in a case of comparing them by means of the risk parameter variance var, the order of combination 2<combination 1<combination 4<combination 3 is yielded In such a manner, the order of the combinations of the components based upon each of the policy information is output as a result.

Figure 34:
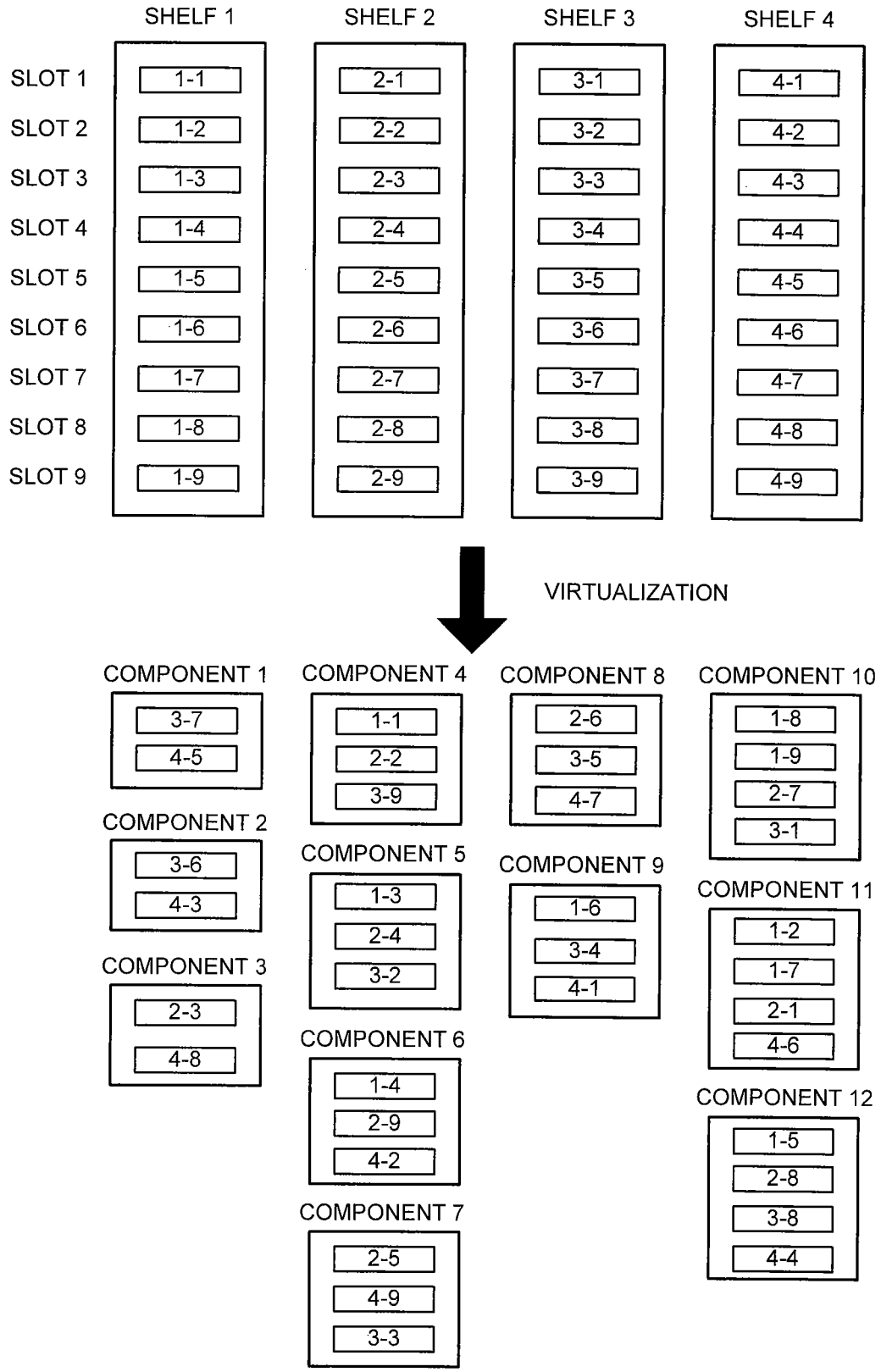
FIG. 34 is a view illustrating an example of virtualizing a plurality of the physical resources as one component.

Additionally, in the above-mentioned explanation, the component was explained as one physical resource having a single function filed into the slot of the shelf; however as shown in FIG. 34, a plurality of the resources may be virtualized as one component to constitute the service unit with this virtualized component. In this case, a database having a relation between a virtualized component and a physical resource constituting this component described is prepared. And, the risk information and the fragment information of the combination of the components are calculated based upon the database in a similar method to the foregoing method according to the actual physical resources constituting each component.

Hereinafter, an example having the foregoing embodiment of the present invention specifically realized will be explained.

Example 1

Next, the specific example 1 of the present invention will be explained in details by making a reference to the accompanied drawings. Additionally, in the following explanation, the node is exemplified as a specific example of the system required for the service for explanation.

Figure 1:
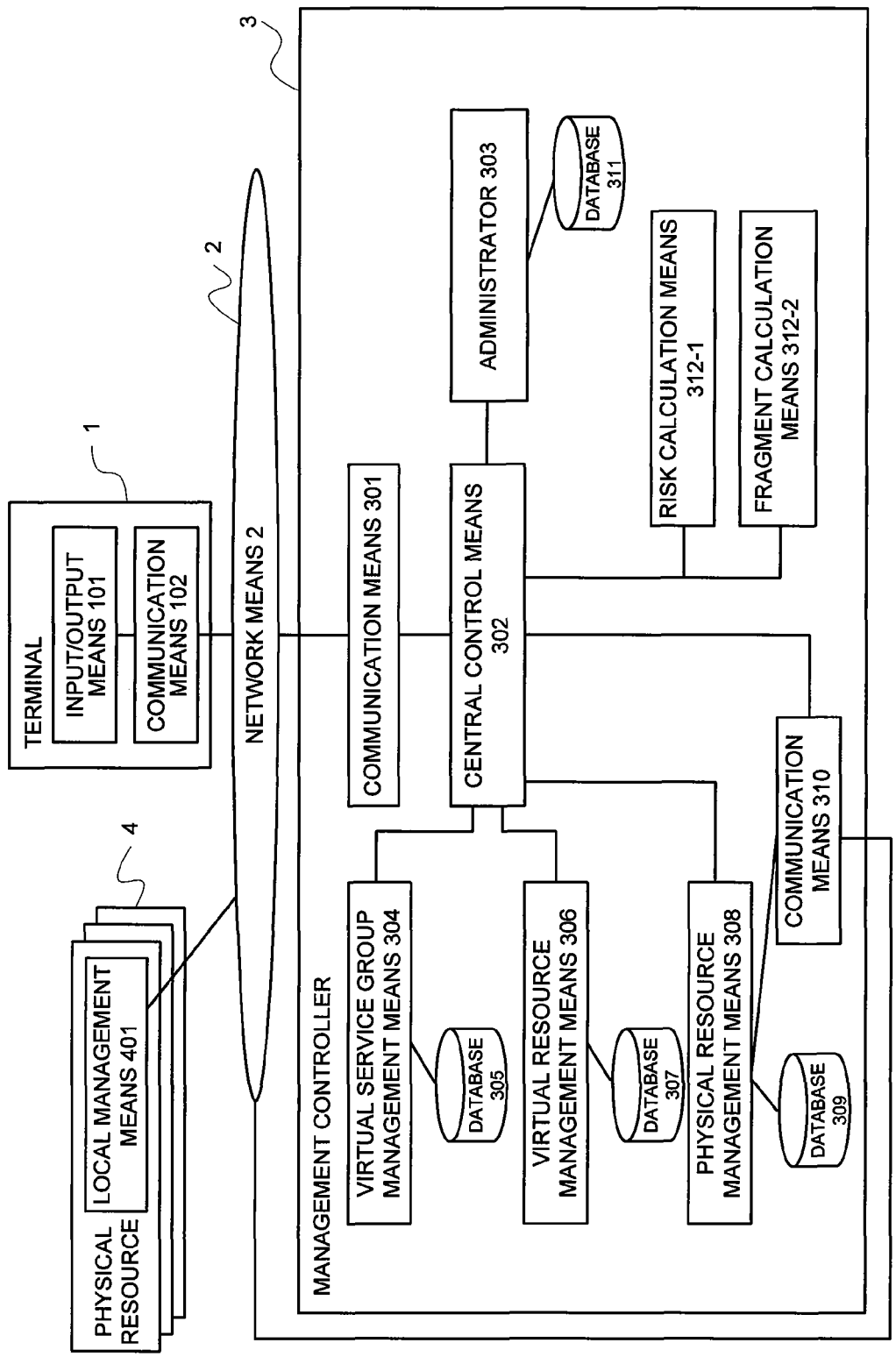
FIG. 1 is a block diagram illustrating a configuration of an example 1 of the present invention.

Upon making a reference to FIG. 1, the example 1 of the present invention is configured of: a terminal 1; network means 2; a physical resource 4 connected to the network means 2 that is configured of a plurality of modular type devices each of which is an object of management within a management system; and a controller 3 connected to the network 2 for, responding to a manager's request for setting/altering the service and acquiring various items of information for the management system from the terminal 1, retrieving the resources that are currently usable, retrieving a setting of the device configuration satisfying the service request from among them according to the policy set in advance, performing an optimal setting, and further, transmitting necessary information.

Hereinafter, a configuration and a function of the terminal 1 will be explained in details.

The terminal 1 is configured of input/output means 101 including a keyboard, a mouse etc. with which the manager inputs a request for acquiring the resource information and various items of the setting information, or a request for setting the service, and a screens etc. for providing information, and communication means 102 that transmits various requests input by the manager to the controller 3 via the network means 2, and receives the information transmitted from the controller 3.

Next, a configuration and a function of the physical resource 4 will be explained in details.

The physical resource 4, which is a modular type resource having an interface of a certain specification mounted onto a common platform, physically is an aggregation of modular type unit physical resources (hereinafter, referred to as a unit physical resource) mounted onto the shelf having its platform, which is typified by a card-shape mode or the like. However, the number of the shelf is not one (1), and the physical resource 4 is generally configured of a plurality of the shelves having a plurality of the unit physical resources.

Further, the physical resource 4, which includes local management means 401 for managing physical information in each unit physical resource or each shelf, is mutually communicable with the controller 3 via the network means 2. For example, it can notify an alarm saying occurrence of the failure in the physical resources that it controls to the controller 3 in some case, and can receive a request for information of the current state by the controller 3 to transmit a reply in some case.

Next, a configuration and a function of the controller 3 will be explained in details.

The controller 3 includes: communication means 301 for receiving manager service request information 2700 to be later described, being a request for setting/altering the service, for example, a request for designating the virtual device and its redundant configuration for the management system that is transmitted from the terminal 1, and a request for acquiring management information other than it, and for transmitting to the terminal 1a result for the request, being a calculation/setting result, or a necessary notification to the manager: a database 311 for preserving policy information 2100 of the operation in setting the service request, which is later described; an administrator 303 for controlling it; a database 309 for preserving a physical resource space information group 2200 for managing the physical resources, for example, a performance, a kind, physical position information, and a state of the physical resource 4; physical resource management means 308 for managing information of its database 309, managing information of the physical resource 4 while updating it regularly, making a reply to an inquiry into information in some case, and updating and notifying information when an alteration to information exits; a database 307 for preserving virtual resource space information 2300 for managing the virtual resources, for example, virtual resource information, being information of the virtualized resources obtained by logically virtualizing the setting and arrangement of the physical resource 4, a performance, a kind, a state thereof, a correspondence relation thereof with the physical resource space information 2200, a correspondence relation thereof with virtual service group space information 2400, or the like; virtual resource management means 306 for managing information of the database 307, making a reply to an inquiry into information in some case, and updating and notifying information when an alteration to information exits; a database 305 for preserving the virtual service group space information 2400 set from the above-mentioned virtual resources; virtual service group management means 304 for managing information of the database 305, making a reply to an inquiry into information in some case, and updating and notifying information when an alteration to information exists; risk calculation means 312-1 for performing a risk calculation necessary for preparing optimal virtual node information for a request by the terminal 1; fragment calculation means 312-2 for performing a fragment calculation; communication means 310 for making communication of information with the foregoing physical resource 4 via the above-mentioned network means 2; and central control means 302 for managing the controller 3 so that it performs necessary processing with an optimal procedure for a request by the above-mentioned terminal 1.

Additionally, all of the means within the controller 3 may not always exist within an identical device, and for example, a configuration may be made so that the physical resource management means 308 and the database 309 are arranged on a separate device, and an access to the physical resource management means 308 and the database 309 is made via the network means 2, and in addition hereto, a configuration may be made so that means is arranged on a separate device to make an access hereto via the network means 2.

Further, the terminal 1, in transmitting various requests to the communication means 301, may use various standard protocols such as telnet, HTTP, SMTP, and SOAP.

Figure 2:
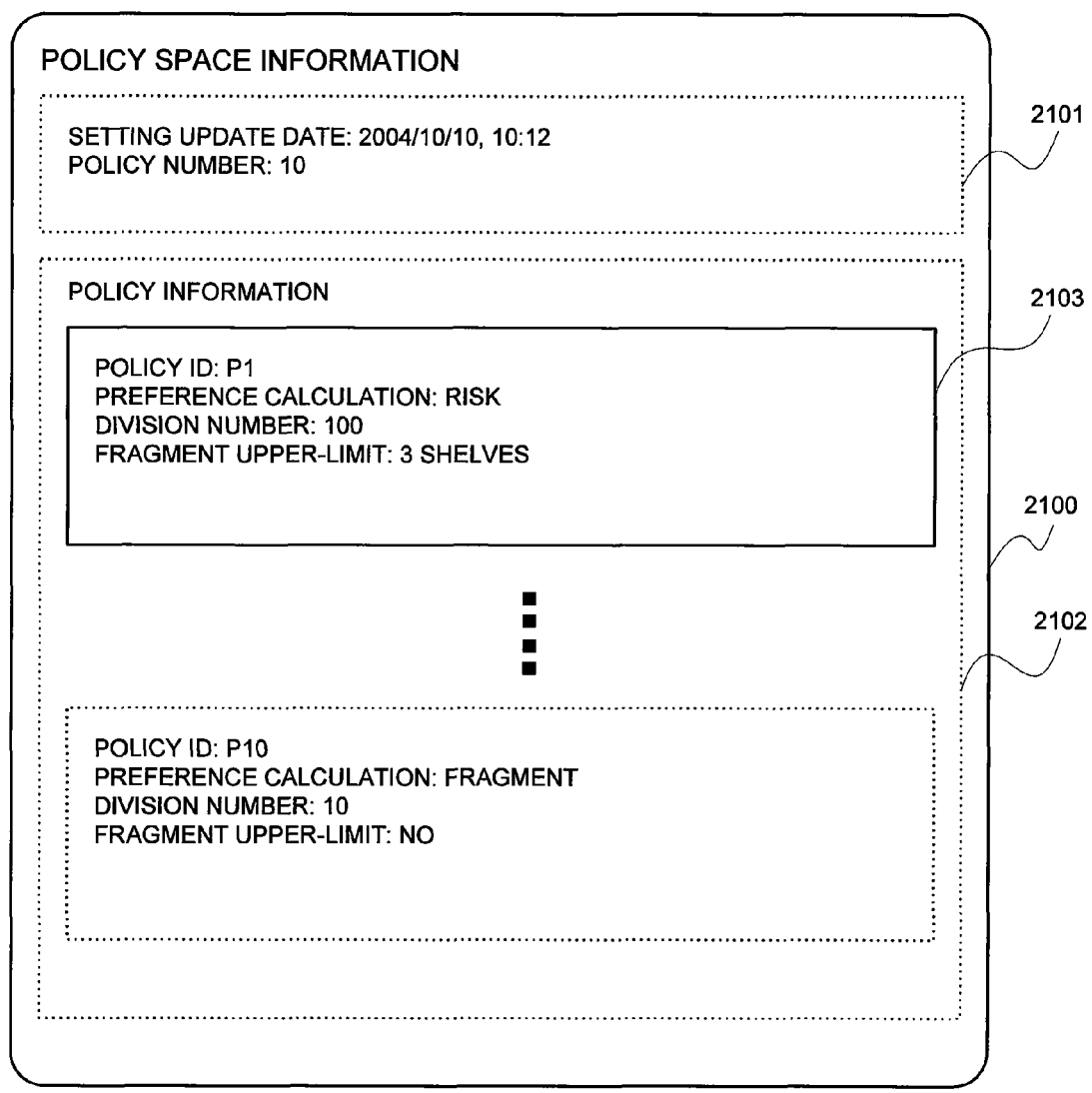
FIG. 2 shows policy space information that is used in the example 1.

Herein, the so-called policy space information 2100 is information on the policy in employing the present invention as shown in FIG. 2, is configured of policy space entirety information 2101, being entire information of the policy space information 2100, and policy information 2102 including detailed information of the policy information individually set/preserved, and is information that the manager inputs via the terminal 1.

Hereinafter, each of information of the policy space information 2100 shown in FIG. 2 will be explained.

The policy space entirety information 2101 preserves entire information of the policy space information, and preserves a setting update date and the policy number within the management system. The setting update date is updated if there exists an alteration to information. Herein, detailed policy information 2103 of which the number is equal to the policy number exists in the foregoing policy space information 2100.

The detailed policy information 2103 includes a policy ID, a preference calculation, a division number, and a fragment upper-limit. The policy ID is denoted with a numerical figure, a symbol, etc. so that it is identified uniquely in the above policy information. The preference calculation makes mention as to whether the risk calculation takes priority or the fragment calculation takes priority. The division number, which is information to be employed for the risk calculation or the fragment calculation, is a division number in dividing the calculation result section by section. The fragment upper-limit, which indicates an upper limit within which the fragment is permitted, specifies, for example, the upper limit etc. as to how many shelves are ridden to form the virtual service unit.

Figure 3:
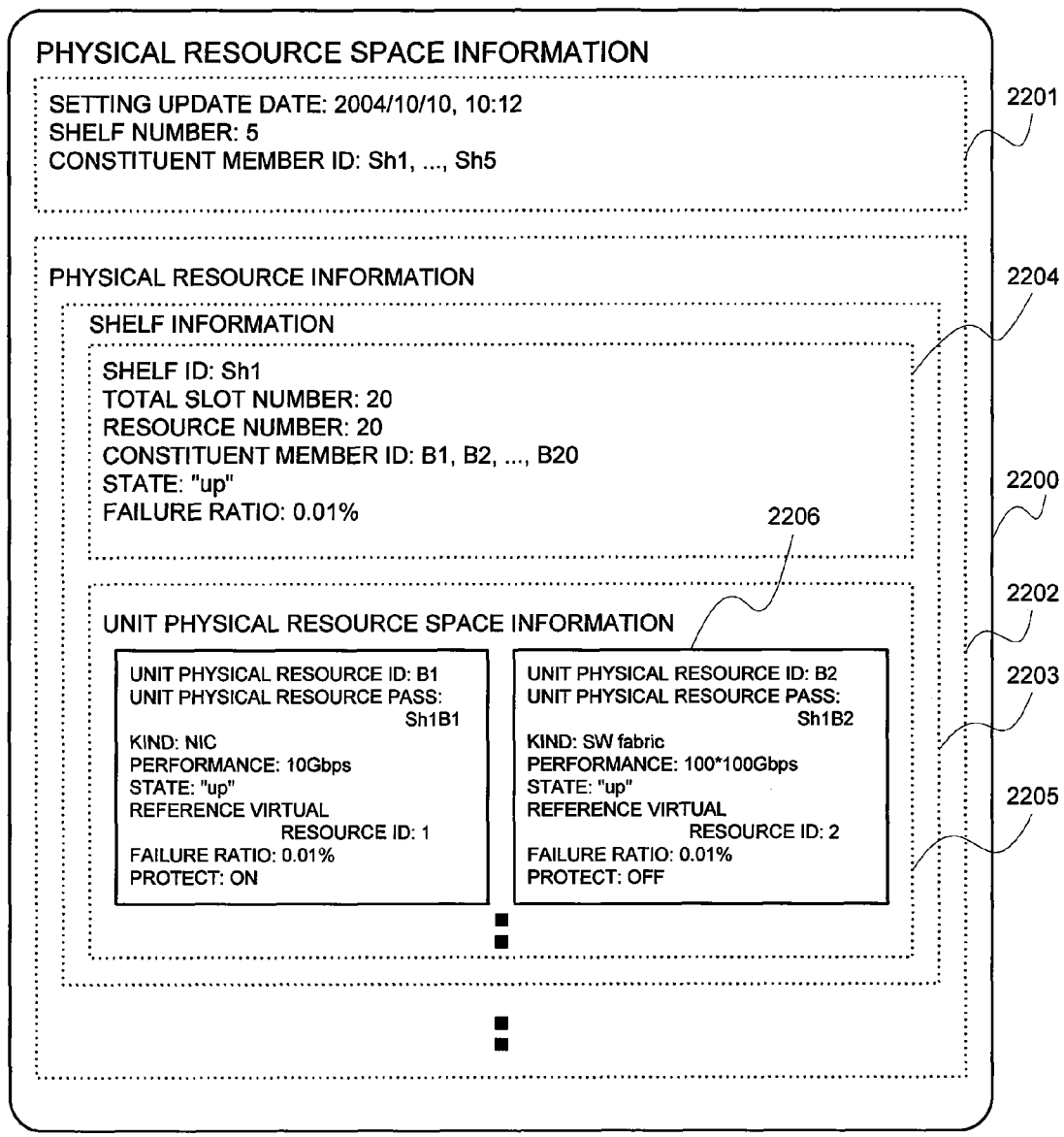
FIG. 3 shows physical resource space information that is used in the example 1.

The so-called physical resource space information 2200, which is each of information of the physical resource 4 to be managed by the present invention as shown in FIG. 3, is configured of physical resource space entirety information 2201, being entire information of the physical resource space information 2200, and physical resource information 2202 for preserving detailed information of the physical resource information that is managed.

Hereinafter, each of information of the physical resource space information 2200 shown in FIG. 3 will be explained.

The physical resource space entirety information 2201 preserves a setting update date, the number of all shelves within the management system, and a constituent member ID, being shelf ID information thereof. The setting update date is updated if an alteration to information exists.

Shelf information 2203 of which the number is equal to that of all shelves exists in the physical resource information 2202.

The shelf information 2203 is configured of shelf entirety information 2204 and unit physical resource space information 2205. The shelf entirety information 2204, which is information of the entirety of the self, is configured of a shelf ID, a total slot number, a resource number, a constituent member ID, a state, and a failure ratio. The ID employing a numerical figure, a symbol, etc., which is uniquely identified in the physical resource information 2202, is allotted to the shelf ID. The total slot number is a total number of the slots on which the unit physical resource can be mounted, and the resource number is a number of the unit physical resources currently mounted. The constituent member ID is an ID of the mounted unit physical resource. The state is an operational state of the entirety of the self such as a power, and a fan. The failure ratio is a failure ratio of the above shelf.

The unit physical resource space information 2205 is configured of detailed unit physical resource space information 2206 that is configured of a unit physical resource ID, a unit physical resource pass, a kind, a performance, a state, a reference virtual resource ID, a failure ratio, and protect.

The unit physical resource ID, which is an ID employing a numerical figure, a symbol, etc. that is uniquely identified within the shelf, is described by employing, for example, a slot number. For example, the unit physical resource mounted onto a slot 3 is referred to as B3. Herein, the symbol B was affixed so as to indicate a unit physical resource. Further, the unit physical resource pass is decided by combining the shelf ID and the physical resource ID so that each unit physical resource is uniquely identified within the management system, and further, the pass is allotted so that it can be seen from the denotation of its ID which slot of which shelf its unit physical resource belongs to. For example, the pass of the unit physical resource mounted onto the slot of the shelf having the shelf ID of Sh3, of which the slot number is 3, is Sh3B3. Herein, the symbol Sh was affixed as a symbol indicating the shelf. The kind and the performance is a kind and performance information of the above unit physical resource, respectively, and the state, which is operational state information, is "up" at the time of normality, "down" at the time of abnormality, and so on. The reference virtual resource ID is a virtual resource ID to which the above unit physical resource relates. Herein, each failure ratio may be input and set directly by the manager, and data learned from statistic information may be automatically acquired and be input as the failure ratio. The so-called protect is information indicating whether to permit sharing the unit physical resource, which has already been used by the other system, with the other system or not. In a case where the protect is ON, it has already been used by the other system, so the sharing is not permitted. Further, in a case where the protect is OFF, it signifies the case that it has not been used by the other system, or the sharing is permitted, so it is usable as a resource.

Figure 4:
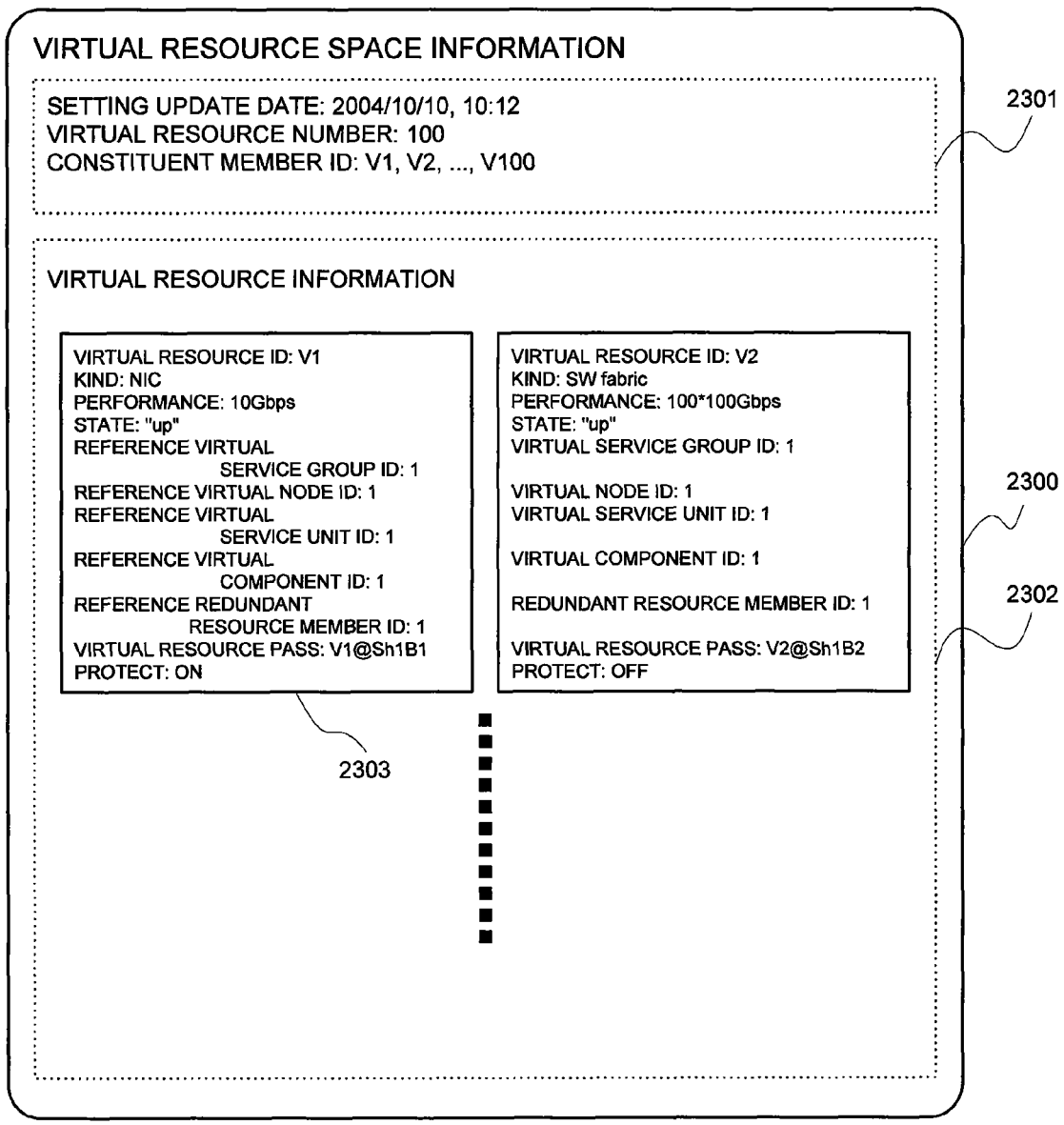
FIG. 4 shows virtual resource space information that is used in the example 1.

The so-called virtual resource space information 2300, which is various items of information of the virtual resources to be managed by the present invention as shown in FIG. 4, is configured of virtual resource space entirety information 2301, being entire information of the virtual resource space information 2300, and virtual resource information 2302 for preserving detailed information of the virtual resource information that is managed. Additionally, the virtual resource information 2302 is information set by the manager based upon the physical resource space information 2200.

Hereinafter, each of information of the virtual resource space information 2300 shown in FIG. 4 will be explained.

The virtual resource space entirety information 2301, which is entire information of the virtual resource space information 2300, preserves an update date, a number of all virtual resources within the management system, and an ID of the constituent virtual resource. The update date is updated if an alteration to information exists.

The virtual resource information 2302 is configured of detailed virtual resource information 2303 for preserving detailed information of the virtual resources that is currently managed, and the detailed virtual resource information 2303 of which the number is equal to the foregoing virtual resource number exists in the virtual resource information 2302.

The detailed virtual resource information 2303 is configured of a virtual resource ID, a kind, a performance, an operational state, a reference virtual service group ID, a reference virtual node ID, a reference virtual service unit ID, a reference virtual component ID, a reference redundant resource member ID, a virtual resource pass, and protect.

The ID employing a numerical figure, a symbol, etc. is allotted to the virtual resource ID so that the virtual resource is uniquely identified within all virtual resources, and for example, it is assumed to be V1. The ID, which has a serial number ranging 1 to a numerical figure equal to the number of all virtual resources, may be allotted. The kind and the performance is a kind and performance information of its virtual resource, respectively, and the state, which is an operational state of the virtual resource, is expressed with "up" if it is normal, and with "down" at the time of abnormality such as a failure. The reference virtual service group ID, the reference virtual node ID, the reference virtual service unit ID, the reference virtual component ID, and the reference redundant resource member ID are the virtual service group ID, the virtual node ID, the virtual service unit ID, the virtual component ID, and the redundant resource member ID described in the virtual service group space information 2400 to which the above virtual resource relates, respectively. If it exists in plural, all are listed. The virtual resource pass is prepared by employing the unit physical resource pass of the related unit physical resource. For example, in a case where a certain virtual resource of which the virtual resource ID is V1 is configured of the unit physical resources having unit physical resource passes Sh1B2 and Sh1B4, respectively, the virtual resource pass thereof becomes V1@Sh1B2_Sh1B4 etc. The so-called protect is information indicating whether to permit sharing the virtual resource, which has already been used by the other system, with the other system or not. In a case where the protect is ON, the virtual resource has already been used by the other system, so the sharing is not permitted. Further, in a case where the protect is OFF, it signifies the case that it has not been used yet by the other system, or the sharing is permitted, so it is usable as a virtual resource.

Figure 5:
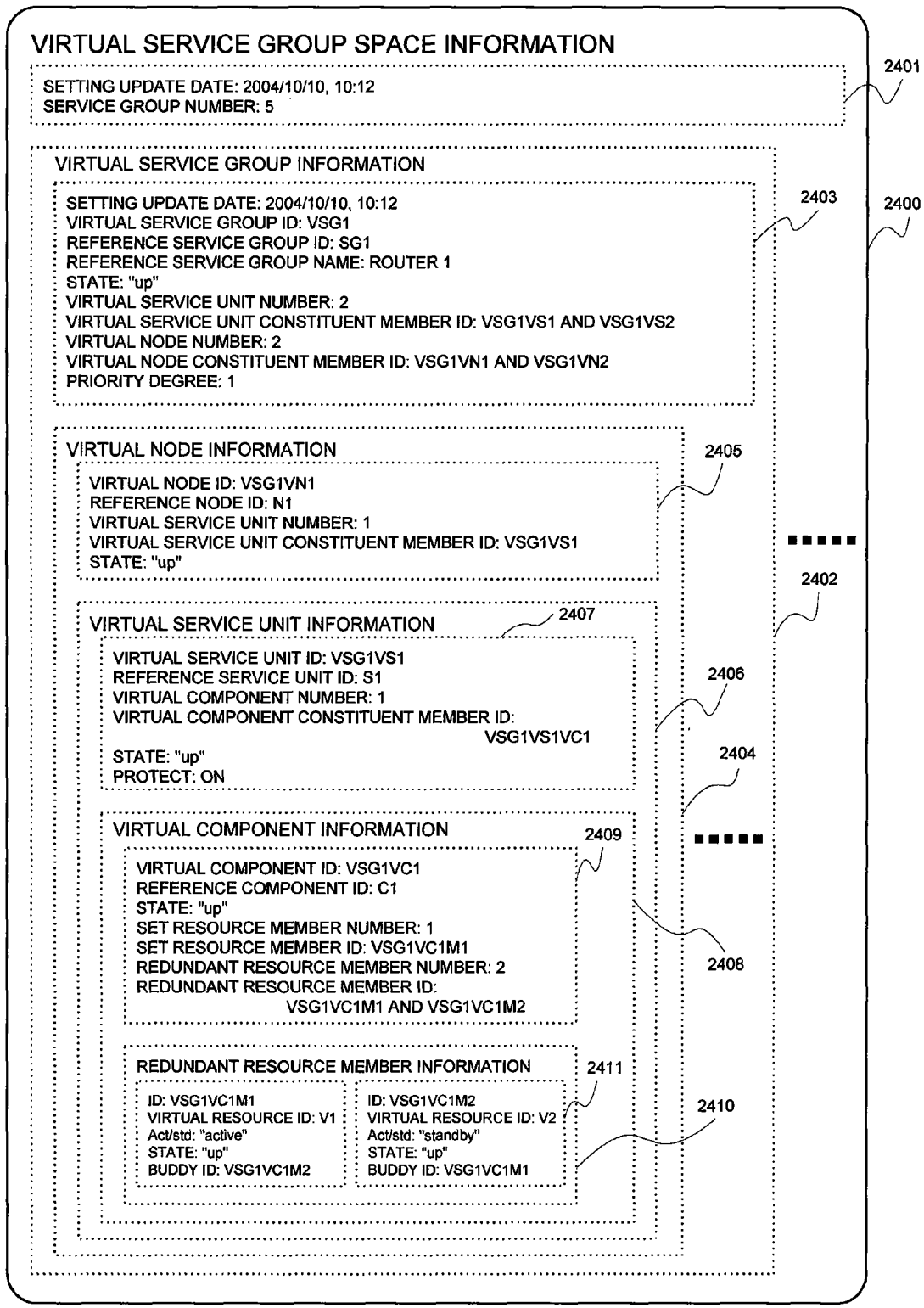
FIG. 5 shows virtual service group space information that is used in the example 1.

The virtual service group space information 2400, which is information of a setting result allocated by performing a calculation of an optimal setting search for the manager service request according to the present invention as shown in FIG. 5, is configured of virtual service group space entirety information 2401, being entire information of the virtual service group space information 2400, and virtual service group information 2402 for preserving the details of the matters set for the service request.

Hereinafter, each of information of the virtual service group space information 2400 shown in FIG. 5 will be explained.

The virtual service group space entirety information 2401, which is entire information of the virtual service group space information 2400, preserves a setting update date and the number of all service groups within the management system. The setting update date is updated if an alteration to information exists.

Herein, the virtual service group information 2402 of which the number is equal to the virtual service group number exists in the virtual service group space information 2400. The virtual service group information 2402 is configured of virtual service group entirety information 2403 for preserving entire information of virtual service group that is currently managed, and virtual node information 2404, and the virtual node information 2404 of which the number is equal to that of the virtual nodes existing in the above virtual service group exits.

The virtual service group entirety information 2403, which is entire information of the virtual service group information 2402, is configured of a setting update date, a virtual service group ID, a reference service group ID, a reference service group name, a state of the virtual service group, a virtual service unit number, a virtual service unit constituent member ID, a virtual node number, a virtual node constituent member ID, and a priority degree.

The setting update date of the virtual service group is updated when an update of its virtual service group exists. The ID employing a symbol, a numerical figure etc. is allotted to the virtual service group ID so that the virtual service group is uniquely identified within the management system.

The reference service group ID, which is described in the manager service request information 2700 etc., and thus, is designated by the manager, is for specifying the service that the manager requests.

The reference service group name is described in the manager service request information 2700 etc., and thus is designated by the manager.

The state, which signifies an operational state of the virtual service group, becomes "up" when the state of all virtual nodes and virtual service units within the above service group is "up", becomes "alarm" when one or more of them is in a state of "down" or "alarm", and yet at least one virtual service unit can provide the service and is in a state of "up", and becomes "down" when all virtual service units are in a state of "down", and yet the virtual service unit that can provide the service within the above virtual service group does not exist.

The virtual service unit number is a total number of all virtual service units belonging to the above virtual service group, and the virtual service unit constituent member ID is an ID of all virtual service units belonging to the above virtual service group.

The virtual node number is a total number of all virtual nodes belonging to the above virtual service group, and the node constituent member ID is an ID of all virtual nodes belonging to the above virtual service group.

The priority degree is a priority degree that is described in the manager service request information 2700 etc., and thus is assigned to the above service group by the manager, and for example, the integer values ranging 1 to 5 are assigned hereto on the assumption that the larger the integer value, the higher the priority, or the like.

The virtual node information 2404 is configured of virtual node entirety information 2405, and virtual component information 2408, and virtual service unit information 2406.

The virtual node entirety information 2405 is configured of a virtual node ID, a reference node ID, a virtual service unit number, being a number of the virtual service unit belonging to the above virtual node, a virtual service unit constituent member ID, and a state indicating an operational state of the virtual node.

The ID using a numerical figure, a symbol, etc., which is uniquely identified in all virtual nodes belonging within the above virtual service group space resources, is allotted to the virtual node ID. For example, one virtual node belonging to the service group of which the virtual service group ID is VSG1 is denoted like VSG1VN1.

The reference node ID, which is described in the manager service request information 2700 etc., and thus is designated by the manager, is for specifying the node that the manager requests.

The virtual service unit number is a total number of all virtual service units belonging to the above virtual node, and the virtual service unit constituent member ID is an ID of all virtual service units belonging to the above virtual node.

The state, which signifies an operational state of the virtual node, includes only "up" and "down", and is assumed to be "clown" when all virtual service units belonging to the above virtual node are in a state of "down".

The virtual service unit information 2406 is configured of virtual service unit entirety information 2407, and virtual component information 2408, and the virtual component information 2408 of which the number is equal to that of the virtual components belonging to the above virtual service unit exists.

The virtual service unit entirety information 2407 is configured of a virtual service unit ID, a reference service unit ID, a virtual component number, a virtual component constituent member ID, and a state signifying an operational state of the virtual service unit, and protect.

The ID using a numerical figure, a symbol, etc., which is uniquely identified in all virtual service units belonging within the above virtual service group space, is allotted to the virtual service unit ID. For example, one virtual service unit, which belongs to the service group of which the virtual service group ID is VSG1, and belongs to the virtual node of which the virtual node ID is VN1 is denoted like VSG1VN1.

The reference service unit ID, which is described in the manager service request information 2700 etc., and thus, is designated by the manager, is for specifying the service unit that the manager requests.

The virtual component number is a total number of the virtual components belonging to the above virtual service unit, and the virtual component constituent member ID is an ID of all virtual components belonging to the above virtual service unit.

The state, which signifies an operational state of the virtual service unit, includes three kinds of "up", "alarm", and "down". "Up" signifies a normal state, "alarm" signifies the case that one virtual component or more belonging to the above virtual service unit comes into a state of "alarm", and "down" signifies the case that one virtual component or more comes into a state of "down".

The so-called protect is information indicating whether to permit sharing the virtual service unit with the other system or not. In a case where the protect is ON, the sharing is not permitted. Further, in a case where the protect is OFF, it signifies the case that the sharing is permitted.

The virtual component information 2408 is configured of virtual component entirety information 2409 and redundant resource member information 2410, and the redundant resource member information 2410 of which the number is equal to that of the redundant resource member belonging to the above virtual component exists.

The virtual component entirety information 2409 is configured of a virtual component ID, a reference component ID, a state signifying an operational state of the virtual component, a set resource member number, a set resource member ID, and a redundant resource member number, and a redundant resource member ID.

The ID employing a numerical figure, a symbol, etc., which is uniquely identified in all virtual components belonging within the above virtual service group space, is allotted to the virtual component ID. For example, one virtual component, which belongs to the service group of which the virtual service group ID is VSG1, and belongs to the virtual node of which the virtual node ID is VN1 is denoted like VSG1VN1VC1.

The reference component ID, which is described in the manager service request information 2700 etc., and thus, is designated by the manager, is for specifying the component that the manager requests.

The set resource member ID is an ID of the redundant resource member of which the setting is currently active out of the redundant resource members, and the set resource member number is its total number.

The redundant resource member number is a total number of all redundant resource members belonging to the above virtual component, and the redundant resource member ID is an ID of all redundant resource members belonging to the above virtual component.

The state, which signifies an operational state of the above virtual component, includes three kinds of "up", "alarm", and "down". The state becomes "up" when, out of redundant resource members belonging to the above virtual component, all are normal, becomes "alarm" when one or more comes into a state of "down", the redundant resource members of which the number is equal to the set resource member number are in a state of "active" and yet the redundant resource member of which the state is normal exists, and becomes "down" when the redundant resource members of which the number is equal to the set resource member number are "active" and yet the redundant resource member of which the state is normal does not exist.

The redundant resource member information 2410 is configured of redundant resource member detailed-information 2411, and the redundant resource member detailed-information 2411 of which the number is equal to that of the redundant resource members belonging to the above redundant resource member information exists.

The redundant resource member detailed-information 2411 includes an ID, a virtual resource ID, act/std, a state signifying an operational state of the redundant resource member, and a buddy ID indicating the redundant resource member that is a partner of the redundant resource group.

The ID employing a numerical figure, a symbol, etc., which is uniquely identified within the above virtual component, is allotted to the foregoing ID. For example, in a case where the virtual component ID is VSG1VN1VC1, the above ID is denoted like VSG1VN1VC1M1.

The virtual resource ID is an ID of the virtual resource caused to relate to the above redundant resource member, and in a case where a plurality of the virtual resources are caused hereto, all related virtual resource IDs are listed.

The act/std designates whether the above redundant resource member is "active" or "standby".

The buddy ID, which indicates an ID of the redundant resource member that is a partner of the redundant resource group, indicates the ID of the redundant resource member designated to be a "standby" one in a case where the act/std is "active", and indicates the ID of the redundant resource member designated to be "active" one in a case where it is "standby". Additionally, if it exists in plural, all are listed.

Figure 6:
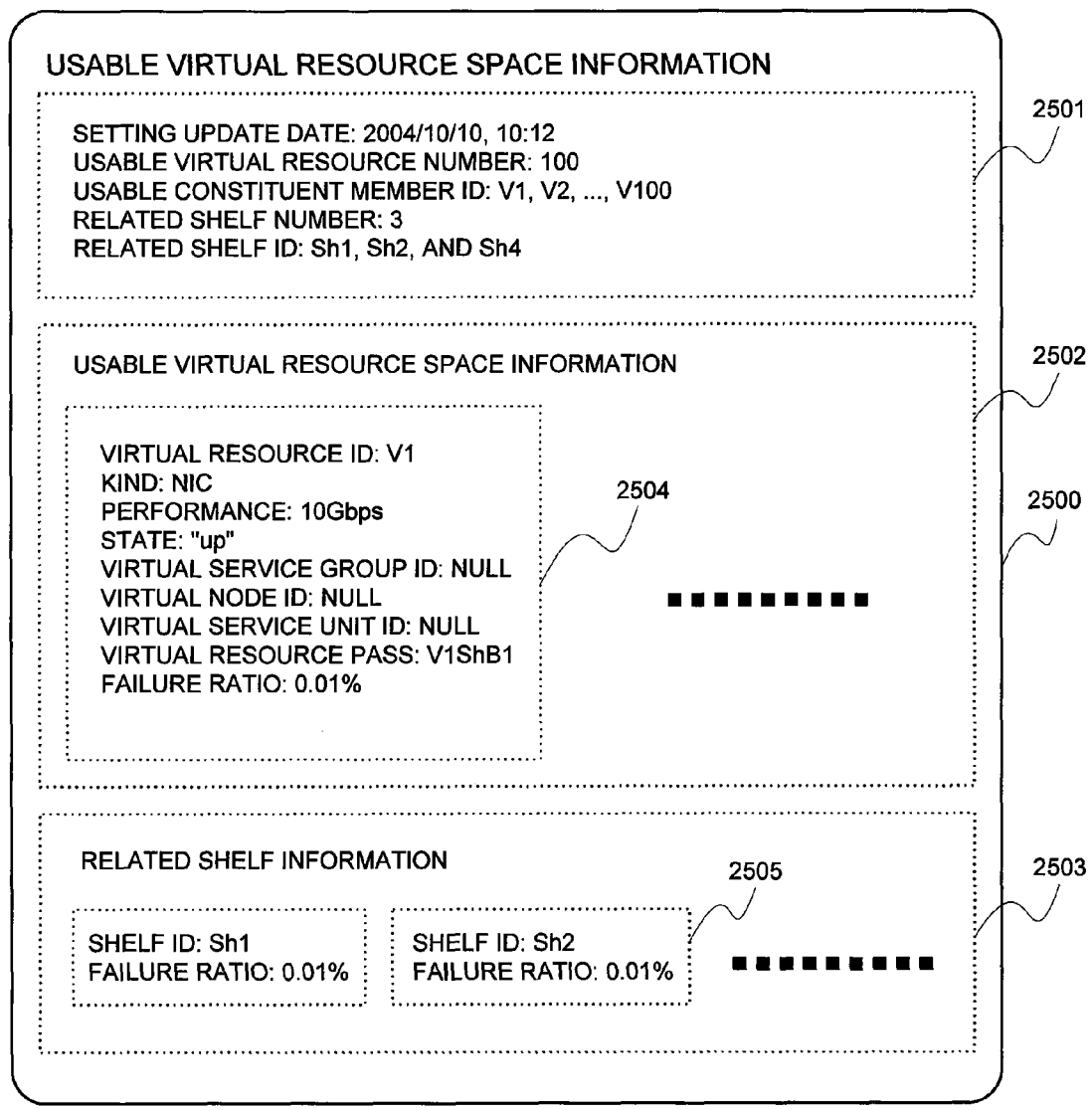
FIG. 6 shows usable virtual resource space information that is used in the example 1.

Usable virtual resource space information 2500, which is information necessary for calculating candidates for the usable virtual resource satisfying a request, an aggregation of its detailed information, a shelf failure ratio, etc. for a manager service request as shown in FIG. 6, is configured of usable virtual resource space entirety information 2501, being entire information of the usable virtual resource space information 2500, usable virtual resource space information 2502, being information of an aggregation of the usable virtual resources, and related shelf information 2503, being information of the self that is related to the foregoing usable virtual resource.

Hereinafter, each of information of the usable virtual resource space information 2500 shown in FIG. 6 will be explained.

The usable virtual resource space entirety information 2501 preserves a setting update date, a usable virtual resource number within the management system, a usable constituent member ID, a related shelf number, and a related shelf ID. The setting update date is updated if an alteration to information exists.

Herein, detailed usable virtual information 2504 of which the number is equal to the usable virtual resource number exists, and detailed related shelf information 2505 of which the number is equal to the related shelf number exists in the usable virtual resource space information 2500, respectively.

In the usable constituent member ID, the IDs of the currently usable virtual resources of which the number is equal to the usable virtual resource number are listed. In the related shelf ID, the IDs of the shelves to which the currently usable virtual resource relates, of which the number is equal to the related shelf number are listed.

The usable virtual resource space information 2502 is configured of the usable virtual resource information 2504, and the usable virtual resource information 2504 is currently usable information that satisfies the requests such as the resource kind and the performance designated by the description in the manager service request 2700, or the like, out of the virtual resource information in the virtual resource space information 2300.

The related shelf information 2503, which is configured of detailed related shelf information 2505, includes detailed information about the self to which the usable virtual resource relates.

Each of the detailed related shelf information 2505 is configured of a shelf ID, and its failure ratio, which is acquired from the shelf information 2202 of the physical resource space information 2200.

Additionally, in the present invention, a configuration is made so as to prepare the usable virtual resource space information 2500 for each service request by the manager, which will be described later. However, a configuration may be made so that the usable virtual resource space information 2500 is compiled into a database, and is updated whenever the usable virtual resource alters, and in a case where the manager makes a request for a service, a reference is made to the usable virtual resource space information 2500.

Figure 7:
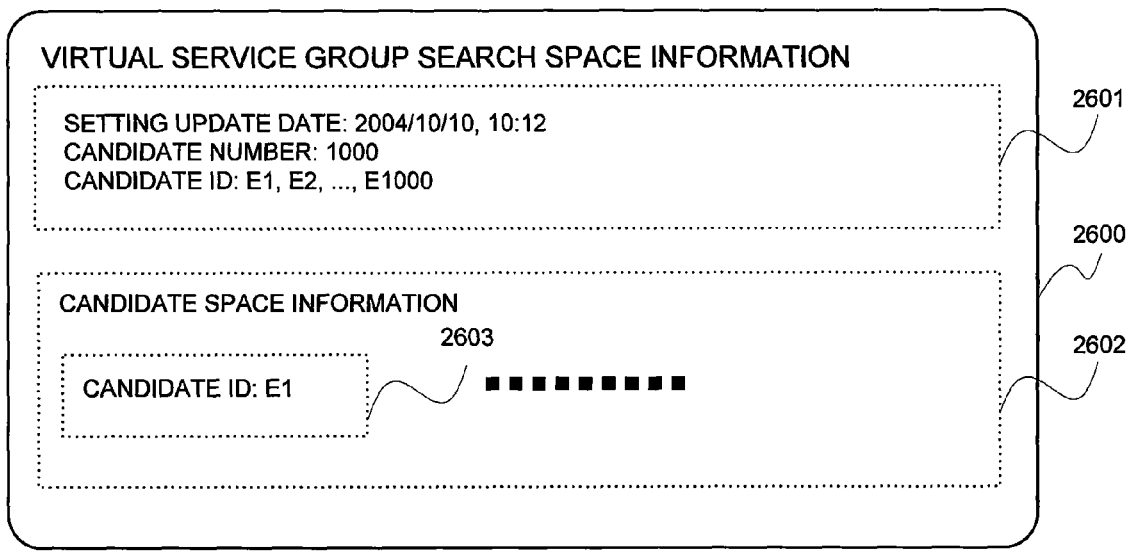
FIG. 7 shows virtual service group search space information that is used in the example 1.

So-called virtual service group search space information 2600, which is information of candidates for the virtual service space satisfying the manager service request that are selected among from the usable virtual resource space information in accordance with the present invention as shown in FIG. 7, is configured of virtual service group search space entirety information 2601, being entire information of the virtual service group search space information 2600, and candidate space information 2602, being information of an aggregation of candidates for the virtual service group satisfying the condition contained in the manager service request.

Hereinafter, each of information of the virtual service group search space information 2600 shown in FIG. 7 will be explained.

The virtual service group search space entirety information 2601 is configured of an update date, a candidate number, and a candidate ID. The update date is updated when an alteration to information exists. The candidate number is the number of candidate 2603 belonging to candidate space information 2602, and the candidate ID is an ID of the above candidate 2603.

The candidate space information 2602 is configured of information of an aggregation of the candidates 2603.

The candidate information 2602 is information of setting candidates for the virtual service group that is configured by employing the usable virtual resources of the usable virtual resource space information 2500 and satisfies the setting service group space that is required by description in a manager service request information 2700, or the like, and the candidate information 2602 includes a format similar to that of the virtual service group space information 2400.

Figure 8:
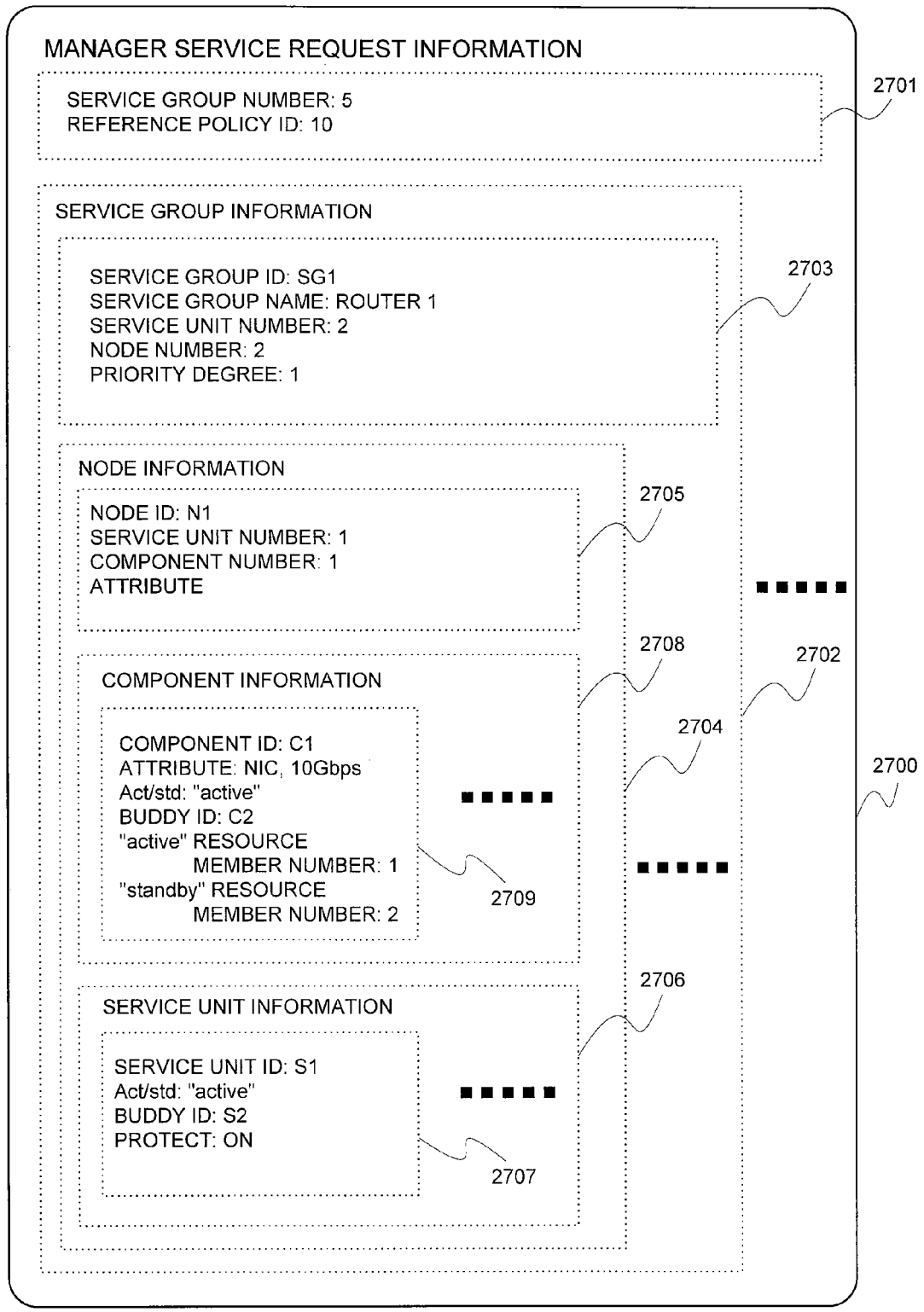
FIG. 8 shows manager service request information that is used in the example 1.

The manager service request information 2700, which is information of a request for the service setting that the manager desires to make in accordance with the present invention as shown in FIG. 8, is configured of manager service request entirety information 2701, being entire information of the manager service request information 2700, and service group information 2702, being detailed information of the service group that the manager desires to set.

Further, the service group information 2702 is configured of node information 2704, being information of a node that is used within the above service group, component information

2708, being information of the virtual resource constituting the foregoing node, and service unit information 2706 having information of the service unit that is assigned to the above service group, its redundant configuration, or the like Hereinafter, each of information of the manager service request information 2700 shown in FIG. 8 will be explained.

The manager service request information 2700 is information having a manager's setting request described.

The manager service request information 2700 is configured of an aggregation of the manager service request entirety information 2701, and the service group information 2702, which is configured of an aggregation of service group entirety information 2703, and the node information 2704, which is configured of node entirety information 2705, the component information 2708, and the service unit information 2706.

The service unit information 2706 is configured of an aggregation of detailed service unit information 2707, and the component information 2708 is configured of an aggregation of component detailed-information 2709.

The entirety information 2701 is comprised of a service group number and a reference policy ID, the service group number signifies the number of the service group information that exists in the manager service request information 2700, and the reference policy ID is an ID for making a reference to the policy space information 2100 in setting the policy.

The service group entirety information 2703 is configured of a service group ID, a service group name, a service unit number, a node number, and a priority degree, and the service group ID is an ID employing a numerical figure, a symbol, etc. that is uniquely identified within the manager service request information 2700, the service group name is a name that is assigned to the above service group, the service unit number is the number of the service units belonging to the above service group, the node number is the number of the nodes belonging to the above service group, the priority degree is a priority degree assigned to the above service group, and, for example, the integer values ranging 1 to 5 are assigned hereto on the assumption that the larger the integer value, the higher the priority.

The node entirety information 2705 is configured of a node ID, an attribute, a component number, and a service unit number, the node ID is an ID employing a numerical figure, a symbol, etc. that is uniquely identified within the manager service request information 2700, the attribute is a kind, a performance, etc. of the node, the component number is the number of the components constituting the above node, and the service unit number is the number of the service units belonging to the above node.

The service unit entirety information 2707 is configured of a service unit ID, act/std, a buddy ID, and protect. The service unit ID is an ID employing a numerical figure, a symbol, etc. that is uniquely identified within the manager service request information 2700. The act/std, which signifies the state into which the above service unit comes by assignment, includes "active" and "standby". The buddy ID is an ID of another service unit that assumes the redundant configuration as a "standby" one of the above service unit in a case where the act/std of the above service unit is "active", and if it exists in plural, all are listed. The so-called protect is information indicating whether to permit sharing the service unit constituting the system (node) required for the service with the other system or not.

The component detailed-information 2709 is configured of a component ID, an attribute, act/std, a buddy ID, and an "active" resource member number, and a "standby" resource member number, the component ID is an ID employing a numerical figure, a symbol, etc. that is uniquely identified within the manager service request information 2700, the attribute is a required resource kind or a required performance of the resource forming the above component, the act/std, which signifies the state into which the above component comes by assignment, includes "active" and "standby", the buddy ID is an ID of another component that assumes the redundant configuration as a "standby" one of the above component in a case where the act/std of the above component is "active", and if it exists in plural, all are listed.

The "active" resource member number is the number of the redundant resource member that becomes "active" out of the redundant resource members forming the above component, the "standby" resource member number is the number of the redundant resource member that becomes "standby", which specifies the redundant configuration between the virtual resources within the component. Herein, the detailed redundant configuration policy also can be described. For example, mention is made as to whether to share the virtual resource with the redundant resource member that is used in another component, or the like.

Next, ID information 1700 will be explained in details.

The ID information 1700 includes information for, from a certain specific virtual resource, enabling the related unit physical resource, virtual service group, virtual node, virtual service unit, virtual component, and redundant resource member to be grasped. For example, the ID information 1700 is configured of a virtual resource ID, a unit physical resource ID, a virtual service group ID, a virtual node ID, a virtual service unit ID, a virtual component ID, and a redundant resource member ID described in FIG. 17.

Next, an entire operation flow of software of the present invention in the case of autonomously executing the step of requesting the service to the step of notifying completion of setting in the example 1 without a manager's confirmation will be explained in details by making a reference to a flowchart of FIG. 9.

(Step S101)

At first, when the manager inputs the manager service request information 2700 from the input/out means 101 of the terminal 1, its information is transmitted from the communication means 102 via the network means 2.

(Step S102)

Next, the communication means 301 receives the request information, and sends it to the central control means 302.

(Step S103)

Next, the central control means 302 inquires the administrator 303 about the related policy information based upon the policy ID described in the request information 2700. The administrator 303 returns to the central control means 302 the policy information described in the policy information 2100 that is obtained based upon the policy ID.

(Step S104)

The central control means 302 inquires the virtual resource space information 2300 of the virtual resource management means 306 about the usable virtual resources having a performance and a kind necessary for satisfying the service request.

(Step S105)

In a case where the virtual resource management means 306 can retrieve the usable virtual resource information from the constituent resource information for satisfying the service request received from the central control means 302 to prepare the usable virtual resource space information 2500 including one usable constituent member or more, it returns it to the central control means 302. On the other hand, in the step 105, in a case where the virtual resource management means 306 can not prepare the usable virtual resource space information 2500 satisfying the condition at all, it notifies its result to the manger, and finishes the operation.

(Step S106)

By using all possible setting combinations employing the virtual resources described in the usable virtual resource space information 2500, the central control means 302 prepares the virtual service group search space information 2600 that is configured of an aggregation of the virtual service group candidate 2604, being the virtual resource setting that makes it possible to constitute the service group, which satisfies the fragment upper-limit described in the policy information and is configured of the service unit, the component, the redundant resource member, and the node described in the service request information 2700, and calls up a calculation flow F1000 for calculating the optimal virtual service group space.

(Step S107)

The central control means 302 calls up appropriate calculation means 312-1 and 312-2 from the preference calculation and the division number described in the policy information according to the calculation flow F1000, executes the calculation, and obtains an optimal virtual service group space as a solution.

(Step S108)

In a case where the solution exists in the step S107, the central control means 302 notifies the solution to the virtual service group management means 304 and the virtual resource management means 306. On the other hand, in a case where no solution exists, the central control means 302 notifies its effect to the manager, and finishes the operation.

(Step S109)

The virtual service group management means 304 updates the virtual service group space information 2400 on the database 305 based upon its solution, and notifies a finish of the update to the central control means 302. Likewise, the virtual resource management means 306 updates the virtual resource space information 2300 on the database 307, and notifies a finish of the update to the central control means 302.

(Step S110)

The central control means 302 notifies completion of the processing and the setting information to the terminal 1 via the communication means 301 and the network means 2, and finishes the operation.

Next, an operation in the case of particularly including a manger's confirmation in setting the virtual service group in this embodiment will be explained in details by making a reference to a flowchart of FIG. 10.

(Step S201)

It is similar to the steps S101 to S106.

(Step S202)

The central control means 302 calls up appropriate calculation means 312-1 and 312-2 from the preference calculation and the division number described in the policy information according to the calculation flow F1000, executes the calculation, and obtains an optimal virtual service group space as a solution.

(Step S203)

In a case where the solution exists, the central control means 302 transmits its solution to the terminal 1 via the communication means 301 and the network means 2, and causes the manager to confirm it. On the other hand, in a case where no solution exists at all, the central control means 302 notifies its effect to the manager, and finishes the operation.

(Step S204)

In a case where the manager has not approved the solution, the central control means 302 remove its solution from the virtual service group search space information 2600, and the operation returns to the step S202 to repeat the identical calculation. On the other hand, in a case where the manager has approved the solution, the process proceeds to a step S205.

(Step S205)

The central control means 302 notifies the solution to the virtual service group management means 304 and the virtual resource management means 306.

(Step S206)

An operation similar to that of the steps S109 and S110 is performed.

Figure 11:
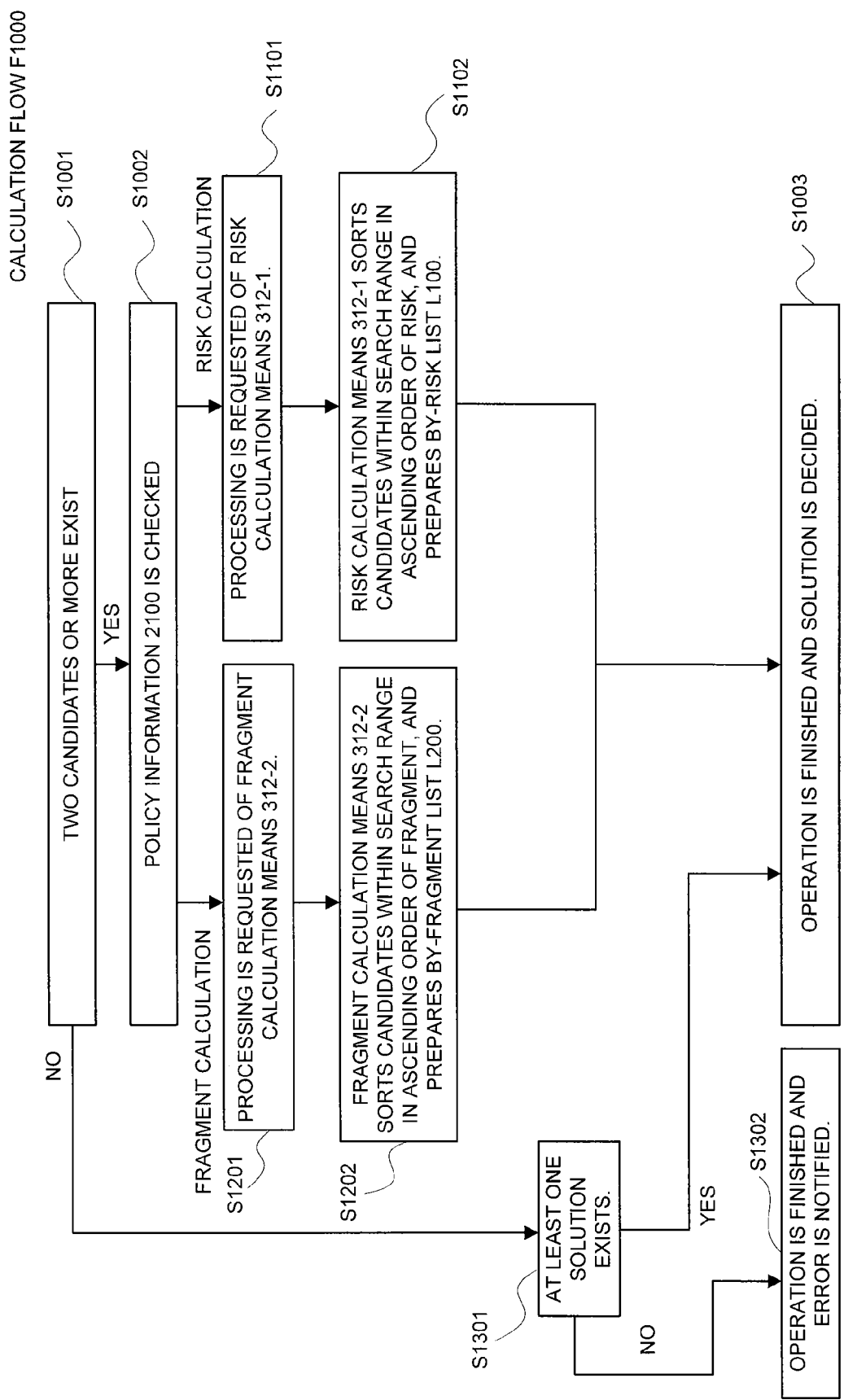
FIG. 11 is a flowchart of an operation of an optimal setting search in the example 1.

Next, the calculation flow F1000 for calculating an optimal candidate as a solution from the virtual service group search space information 2600 will be explained in details by making a reference to a flowchart of FIG. 11.

(Step S1001)

In a case where two candidates or more exist in the virtual service group search space information 2600, the operation proceeds to a step S1002. In a case where they do not exist, the operation proceeds to a step S1301.

(Step S1002)

The preference calculation information described in the policy information 2100 is checked. In a case where the risk calculation takes priority, the operation proceeds to a step S1101, and in a case where the fragment calculation takes priority, the operation proceeds to a step S1201.

(Step S1101)

The virtual service group search space information 2600 and the division number are delivered to the risk calculation means 312-1 to request the processing of it.

(Step S1102)

The risk calculation means 312-1 sorts the candidates within a search range in the ascending order of the risk according to a risk calculation flow F2000, and prepares a by-risk list L100, and then the operation proceeds to a step S1003.

(Step S1201)

The virtual service group search space information 2600 and the division number are delivered to the fragment calculation means 312-2 to request the processing of it.

(Step S1202)

The fragment calculation means 312-2 sorts the candidates within a search range in the ascending order of the fragment according to a fragment calculation flow F3000, and prepares a by-fragment list L200.

(Step S1003)

The candidate that ranks highest in the list L100, the list L200 or the list L300 is decided as a solution.

(Step S1301)

In a case where one solution exists, a list L300 having only its solution described is prepared and the operation proceeds to the step S1003, and in a case where no solution exists at all, the operation proceeds to a step S1302.

(Step S1302)

An error is notified, and the calculation is finished.

Next, how to obtain the risk parameter average and variance for quantifying the risk in the risk calculation will be explained in details by making a reference to FIG. 12.

The risk management in the present invention has an object of, when a failure has occurred in a risk-sharing body, reducing the number of the active service units assigned hereto that are switched over if circumstances permit. Further, simultaneously therewith, it has another object also of preventing the number of active service units from deflecting to one certain risk-sharing body.

Figure 12:
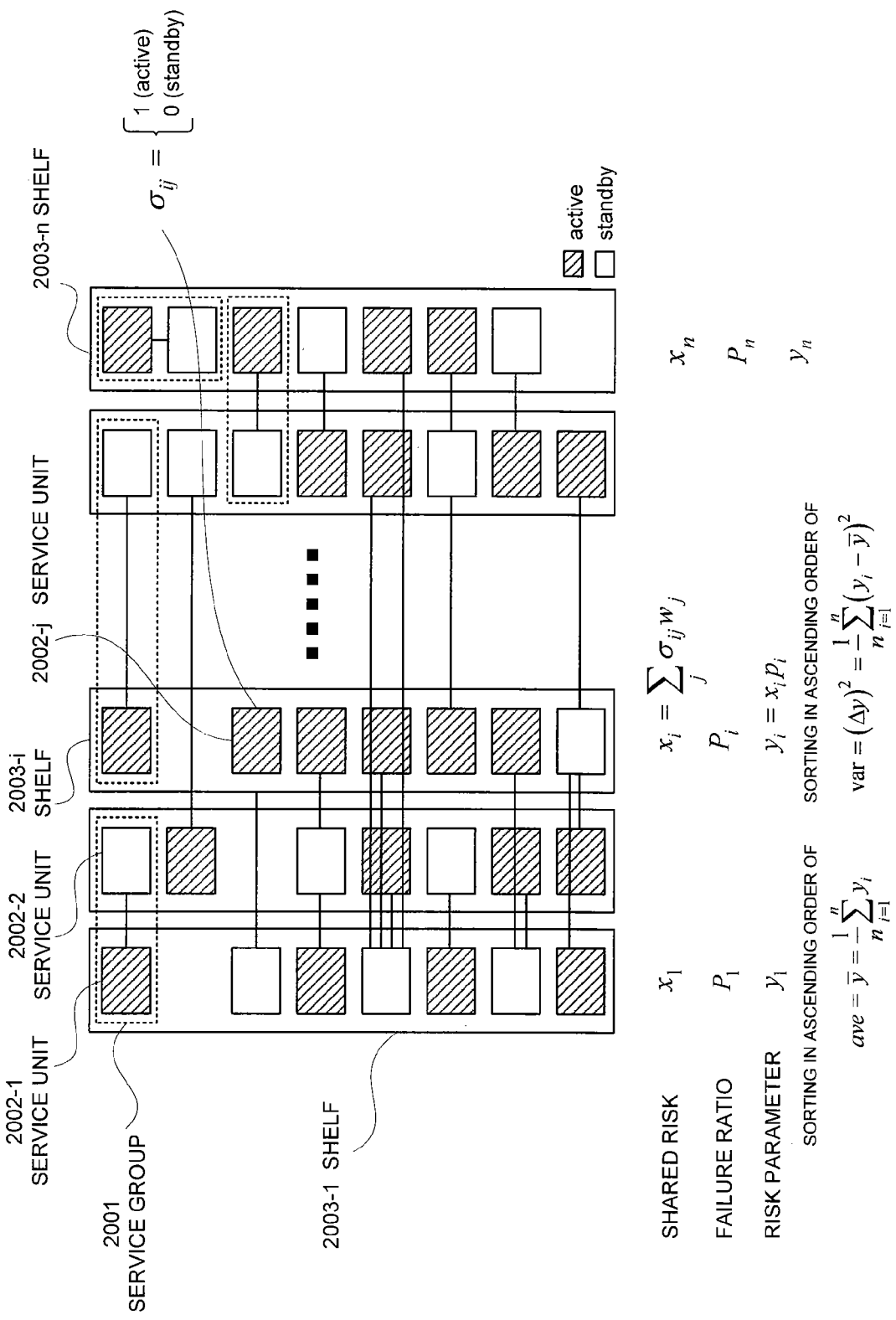
FIG. 12 is an explanatory view of how to define a risk parameter in the example 1.

FIG. 12 is a view of one example of, responding to a request for assigning a certain plurality of the service groups each having the redundant configuration specified, having assigned the service groups and the service units thereof to shelves 2003-1 to 2003-n so as to satisfy this request. Herein, the shelves 2003-1 to 2003-n indicate a risk-sharing body, so to speak, a logical entity signifying a gathering of the physical resources to which some resources are supplied, and the service unit defined on this assumption is a logical entity of or within the device, being an aggregation of the resources within the shelf. The above risk parameter is a parameter for quantitatively calculating the risk of the state of this assignment.

At first, the state of the service unit 2002-j on the shelf 2003-i is described with a variable $\sigma_v$, and its value is assumed to be 1 if the state is "active", and its value is assumed to be 0 if the state is "standby". Further, the priority degree described in the service request information 2700 is employed as a priority degree of its service, and its variable is assumed to be $w_v$. Herein, with $w_v$, the larger the value, the higher the priority degree.

Next, a shared risk $x_i$ in the shelf 2003-i is defined to be a sum of $\sigma_v \times w_v$ in the entirety of the shelf 2003-i. This is the sum of the values obtained by multiplying the variable of the active service unit on the shelf 2003-i by the weight of the priority degree.

Next, a failure ratio $p_i$ of the shelf 2003-i is defined. The shelf failure ratio described in the usable virtual resource space information 2500 is employed as a failure ratio; however herein, the manager may set the failure ratio arbitrarily.

Next, upon assuming the value obtained by multiplying the shared risk $x_i$ of the shelf 2003-i by the failure ratio $p_i$ to be a risk parameter $y_i$ of the shelf 2003-i, an average ave and a variance var of the risk parameters $y_i$ in the entirety of the management system are obtained.

With the procedure mentioned above, the risk parameter average and variance for quantitatively defining the risk can be obtained. Herein, the risk parameter average signifies magnitude of the risk, the risk parameter variance signifies a deflection of the risk among the nodes, and it is desirable that the risk is small and yet is flatten, that is, both of the average and the variance of the risk parameter are small.

Figure 13:
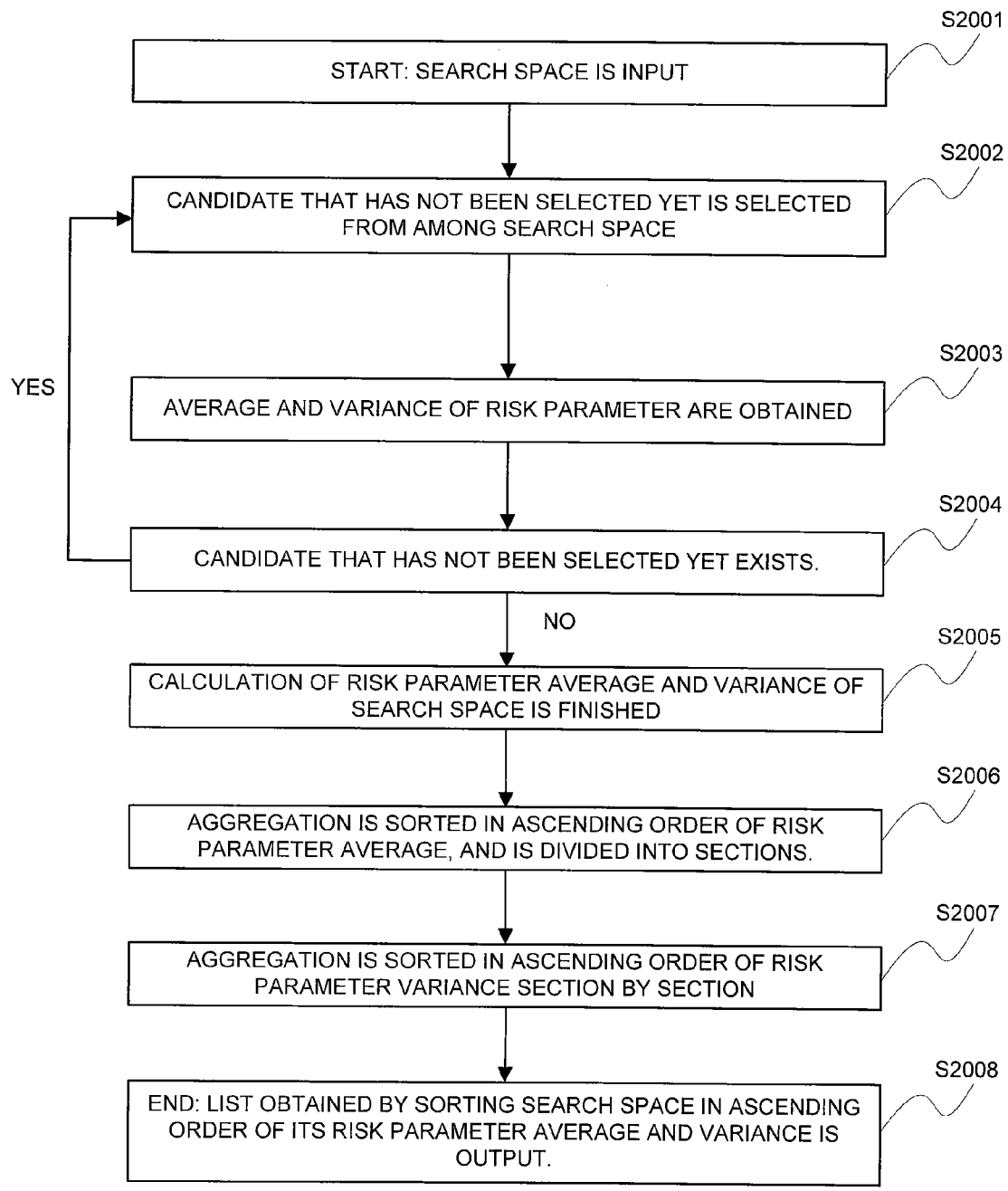
FIG. 13 is a flowchart of an operation of calculating the risk in the example 1.

Next, the calculation flow F2000, being an operation in the risk calculation, will be explained in details by making a reference to a flowchart of FIG. 13.

(Step S2001)

A search space and the division number are input. Herein, the search space is an aggregation of the candidates having a plurality of the service groups set that include a plurality of the nodes and a plurality of the service units.

(Step S2002)

One candidate that has not been selected yet is selected from among the search space.

(Step S2003)

The average and variance of the risk parameter of its candidate are obtained.

(Step S2004)

In a case where the candidate that has not been selected yet exists within the search space, the operation proceeds to the step S2002.

In a case where the candidate that has not been selected yet does not exist, the operation proceeds to a step S2005.

(Step S2005)

The calculation of the risk parameter average and variance of the search space is finished.

(Step S2006)

The aggregation is sorted in the ascending order of the risk parameter average, and divided into sections of which the number is equal to the division number.

(Step S2007)

The aggregation is sorted in the ascending order of the risk parameter variance section by section.

(Step S2008)

A list of the solutions obtained by sorting the search space in the ascending order of the risk parameter average, or the variance within the defined section is output, and the operation is finished.

The foregoing calculation flow F2000 is a flow in the case that, with the ranking of the risk, the candidates of which the risk parameter average falls into a certain section that is appropriate are regarded as a candidate having an identical risk in terms of the risk parameter average, respectively, and the candidate of which the risk parameter variance is smallest is regarded as a candidate having a lowest risk.

Herein, the candidate of which the risk parameter average is lowest may be regarded as a candidate having a lowest risk, and the candidate of which the risk parameter variance is lowest may be regarded as a candidate having a lowest risk.

Next, how to obtain the fragment parameter average and variance for quantifying the fragment in the fragment calculation will be explained in details by making a reference to FIG. 14.

The fragment management in the present invention has an object of, in using the modular type unit resources mounted onto the shelf to form a certain service unit, quantifying whether to select the resources constituting its service unit from one physical shelf, or from a plurality of selves, and managing them so that the fragment thereof is small, if circumstances permit.

Figure 14:
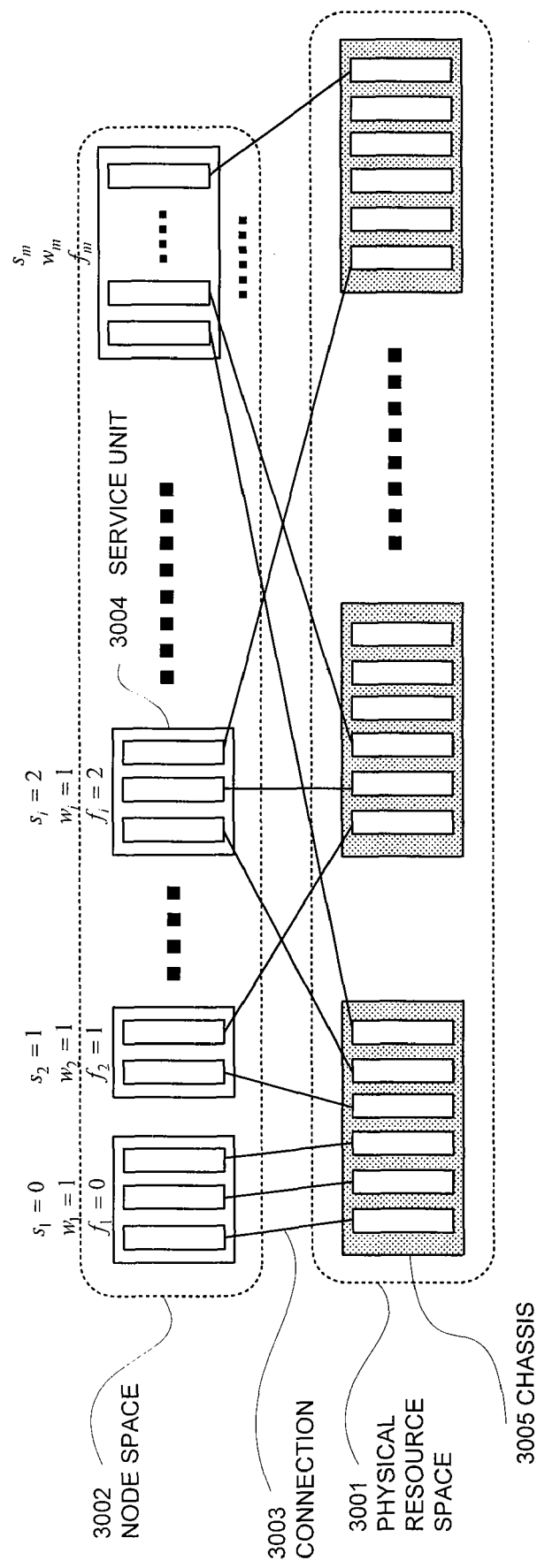
FIG. 14 is an explanatory view of how to define a fragment parameter in the example 1.

FIG. 14 is a view illustrating the state that the unit physical resources has been assigned to a service unit space 3002 including a plurality of the service units. A connection 3003 between the service unit space 3002 and a physical resource space 3001 indicates a relation with the physical resources used in forming the component.

At first, the number obtained by subtracting 1 (one) from the number of the related selves is defined as a related shelf number si of the service unit 3000-i. For example, in a case of using the resources from three different selves in all in order to form the service unit, the related shelf number becomes 2.

And, a priority degree $w_i$ of each service unit 3000-i is assumed to be the priority degree described in the service request information 2700. The priority degree is designated by assigning the integral values ranging 1 to 5 in a five-staged manner on the assumption that the larger the value, the higher the priority degree, or the like, Next, the value obtained by multiplying si by $w_i$ is defined to be a fragment parameter $f_i$ of the service unit 3000-i.

The average ave and the variance var of this fragment parameter $f_i$ in the entirety of the management system are obtained, and assumed to be the fragment parameter average and variance, respectively.

With the procedure mentioned above, the fragment parameter average and variance for quantitatively defining the fragment can be obtained. Herein, the fragment parameter average signifies magnitude of the fragment in setting the service unit within the management system, the fragment parameter variance signifies a deflection of the fragment, and it is desirable that the fragment is small and yet is flatten, that is, both of the average and the variance of the fragment parameter are small.

Figure 15:
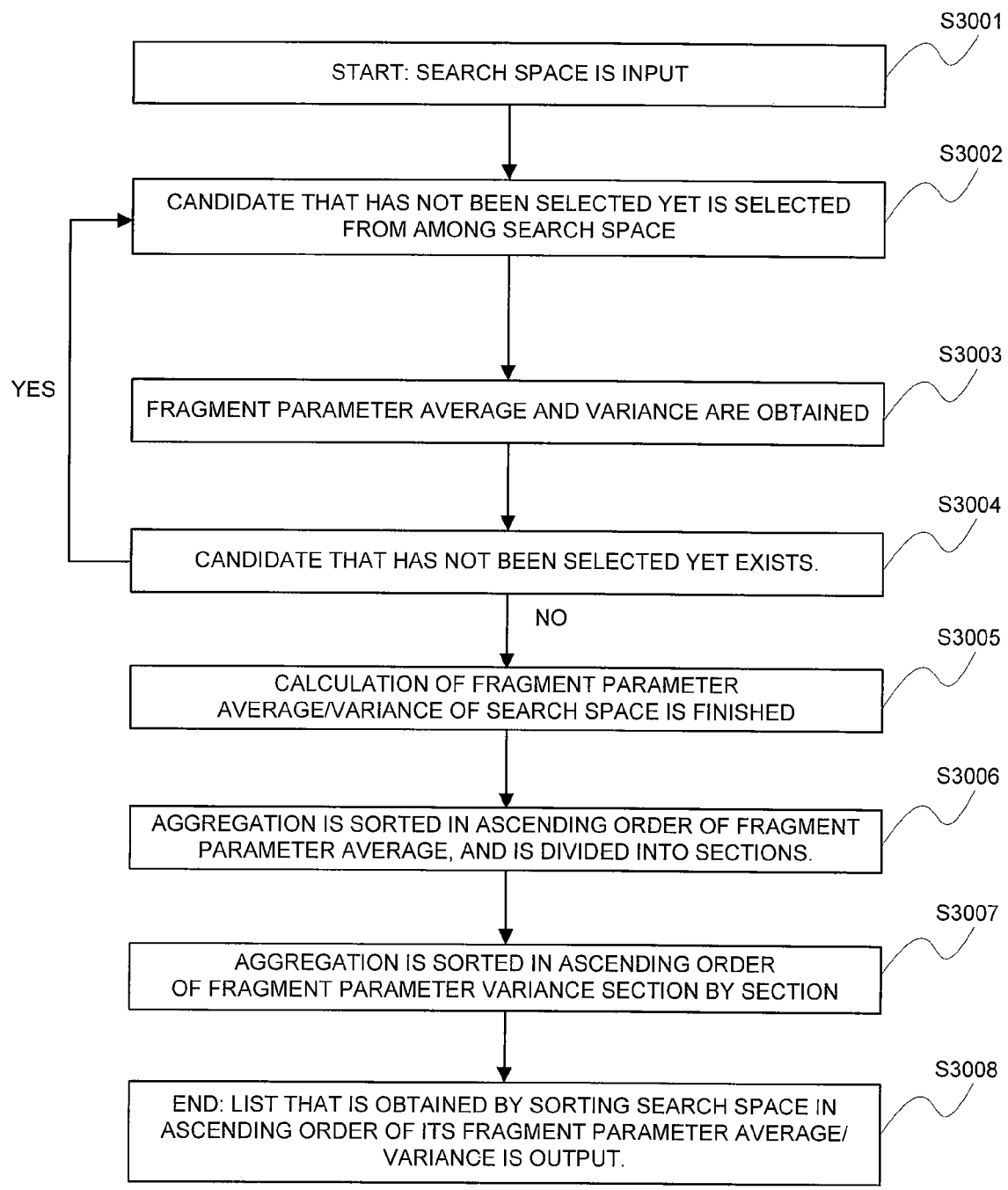
FIG. 15 is a flowchart of an operation of calculating the fragment in the example 1.

Next, the calculation flow F3000 in the fragment calculation will be explained in details by making a reference to a flowchart of FIG. 15.

(Step S3001)

A search space and the division number are input. Herein, the search space is an aggregation of the candidates that has a plurality of the service units caused to relate to a plurality of the physical resources set.

(Step S3002)

One candidate that has not been selected yet is selected from among the search space.

(Step S3003)

The average and variance of the fragment parameter of its candidate are obtained.

(Step S3004)

In a case where the candidate that has not been selected yet exists within the search space, the operation proceeds to the step S3002.

In a case where the candidate that has not been selected yet does not exist, the operation proceeds to a step S3005.

(Step S3005)

The calculation of the fragment parameter average and variance of the search space is finished.

(Step S3006)

The aggregation is sorted in the ascending order of the fragment parameter average, and divided into sections of which the number is equal to the division number described in the policy information 2100.

(Step S3007)

The aggregation is sorted in the ascending order of the fragment parameter variance section by section.

(Step S3008)

A list of the solutions obtained by sorting the search space in the ascending order of its fragment parameter average, or the variance within the defined section is output, and the operation is finished.

The foregoing calculation flow F3000 is a flow in the case that, with the ranking of the risk, the candidates of which the fragment parameter average falls into a certain section that is appropriate is regarded as a candidate having an identical fragment in terms of the fragment parameter average, respectively, and the candidate of which the fragment parameter variance is smallest in its section is regarded as a candidate having a lowest fragment.

Herein, the candidate of which the fragment parameter average is lowest may be regarded as a candidate having a lowest fragment, and the candidate of which the fragment parameter variance is lowest may be regarded as a candidate having a lowest fragment.

Herein, the risk calculation and the fragment calculation can be executed in combination with each other. For example, in a case where the risk management takes priority, out of the list L100 sorted with the risk by the risk calculation, the allowable range is decided, the fragment calculation is executed in its range, and the list L200 sorted fragment by fragment is prepared, thereby making it possible to minimize the fragment while keeping the risk at a constant level. Likewise, in a case where the fragment management takes priority, out of the list L200 sorted with the fragment by the fragment calculation, the allowable range is decided, the risk calculation is executed in its range, and the list L100 sorted risk by risk is prepared, thereby making it possible to minimize the risk while keeping the fragment at a constant level.

Herein, with both of the risk calculation and the fragment calculation, it is also possible to employ various sorting techniques, for example, the technique of selecting, for example, higher 10% of the candidates in the ascending order of the average value instead of the division number, and sorting them in terms of the variance, or the like.

The above explanation is an explanation of an operation ranging from the service request to the automated setting.

Figure 16:
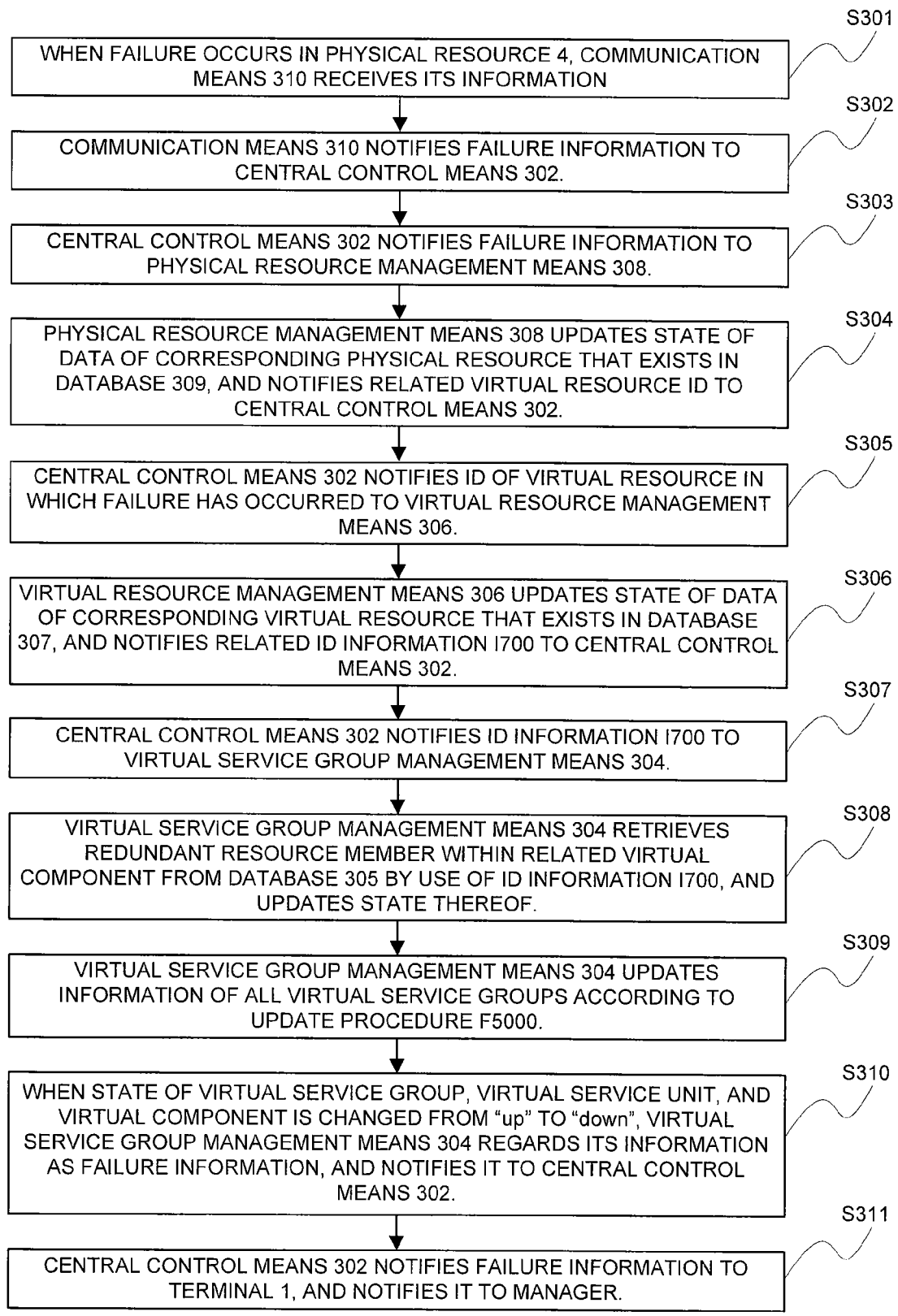
FIG. 16 is a flowchart of an operation of notifying a failure at the time of occurrence of the failure in the example 1.

Next, an operation of notifying a failure to the manager at the time of an occurrence of the failure will be explained in details by employing a flowchart of FIG. 16.

With the above flow, the effect that it has become impossible to provide the service in operation is notified to the manager, who can take a step of the failure recovery processing responding to the notified failure information. For example, in a case where a failure has occurred in the "active" service unit pre-set in the foregoing service instance, the processing of making a switchover to the "standby" service unit, or the like can be performed. Further, when the service continues notwithstanding an occurrence of abnormality, for example, when the service can continue as the component by making a switchover to the "standby" resource even though the resource having "active" set, out of the foregoing redundant resource members, comes into a state of "down", or the like, notifying only an alarm enables the effect to be notified to the manger, who can take any countermeasure.

Next, the detailed operation will be explained while following a flow.

(Step S301)

When a failure occurs in the physical resource 4, the communication means 310 receives its information.

(Step S302)

The communication means 310 notifies the received failure information to the central control means 302, which starts a failure-time process. Herein, a failure detection notification may be issued to the controller 3 by the physical resource 4, and the controller 3 regularly may transmit an information acquisition message, thereby allowing the central control means 302 to determine the failure from its information. In this case, for example, the method in which the central control means 302 pre-requests the physical resource management means 308 to regularly acquire information of the physical resources that it controls, and to determine its state, and the latter monitors the state of the physical resource 4 via the communication means 310, or the like is employed.

(Step S303)

The central control means 302 notifies the failure information to the physical resource management means 308.

(Step S304)

The physical resource management means 308 updates the state of data of the corresponding physical resource of the physical resource space information 2200 that exists in the database 309, and notifies a related virtual resource ID to the central control means 302.

(Step S305)

The central control means 302 notifies the ID of the virtual resource in which the failure has occurred to the virtual resource management means 306.

(Step S306)

The virtual resource management means 306 updates the state of data of the corresponding virtual resource of the virtual resource space information 2300 that exists in the database 307, and notifies to the central control means 302 retrieval ID information necessary for retrieving virtual service group information that is related to the updated virtual resource. The above retrieval ID information is, for example, the related ID information 1700 shown in FIG. 17.

(Step S307)

The central control means 302 notifies the ID information 1700 to the virtual service group management means 304.

(Step S308)

The virtual service group management means 304 retrieves the redundant resource member within the related virtual component that is related with the ID information 1700 from the virtual service group space information 2400 that exists in the database 305, and updates its state.

(Step S309)

The virtual service group management means 304 updates information of all virtual service groups within the virtual service group space information 2400 according to an update procedure F5000.

(Step S310)

When the state of the virtual service group, the virtual service unit, the virtual component, and the redundant resource member is changed from "up" to "alarm", or to "down", the virtual service group management means 304 notifies all of its information to the central control means 302 as failure information.

(Step S311)

The central control means 302 notifies the failure information to the terminal 1, and notifies it to the manager. Next, the update procedure F5000 will be explained in details. The update procedure F5000 specifies the operation that is performed in the case that the state has been updated within the virtual service group space information 2400.

(The Case that the State of the Redundant Resource Member Detailed-Information 2411 has Become "Down" from "Up")

In the case that the act/std in the redundant resource member detailed-information 2411 was "active", the virtual service group management means 304 changes the act/std into "error", looks for the redundant resource member of which the state and the act/std are "up" and "standby", respectively, out of the redundant resources members having its buddy ID, changes the act/std from "standby" to "active", and changes the state of the virtual component entirety information 2409 to which the above redundant resource member itself belongs from "up" to "alarm". In a case where it exists in plural, one (1) is selected at random. In a case where it does not exist at all, the virtual service group management means 304 changes the state of the virtual component entirety information 2409 from "up" or "alarm" to "down".

Further, in the cased that "act/std" of the redundant resource member 2411 was "standby", it changes the act/std into "error", and changes the state of the virtual component entirety information 2409 from "up" to "alarm".

(The Case that the State of the Virtual Component Entirety Information 2409 has been Changed from "Up" to "Alarm")

It changes the state of the virtual node entirety information 2405 of the virtual node to which the above virtual component itself belongs, and the state of the virtual service unit information 2407 of the virtual service unit belonging to the above virtual node from "up" to "alarm", respectively.

(The Case that the State of the Virtual Component Entirety Information 2409 has been Changed from "Up" or "Alarm" to "Down")

In the case that state of the virtual component entirety information 2409 has been changed from "up" to "down", or from "alarm" to "down", it changes the state of the virtual node entirety information 2405 of the virtual node to which the above virtual component itself belongs from "up" to "down", or from "alarm" to "down".

(The Case that the State of the Virtual Node Entirety Information 2405 has Been Changed to "Down")

It changes the state of all virtual service units belonging to the above virtual node to "down".

It changes the state of the virtual service group to which the above virtual node belongs to "alarm".

(The Case that the State of the Virtual Service Unit Entirety Information 2407 has been Changed from "Up" to "Alarm" or to "Down")

It changes the state of the virtual service group entirety information 2403 of the virtual service group to which the above service unit itself belongs from "up" to "alarm". In a case where the state of the virtual service group entirety information 2403 is "alarm" or "down", the state is left unchanged.

(The Case that the State of all of the Virtual Service Unit Entirety Information 2407 Belonging to the Virtual Service Group has been Changed to "Down")

It changes the state of the virtual service group entirety information 2403 to "down".

In a case where information has been updated newly, the updated information is notified to the manager.

Next, an automatic optimization update procedure at the time that an alteration to the system has been made will be explained in details. With the above procedure, for example, the optimization calculation can be performed again in a case where the current system to which an alteration has been made is different from the system at the time point of previously having performed the risk calculation and the fragment calculation, for example, due to additionally installing the unit physical resource and newly forming the virtual resource, being accompanied by it, or the like.

(Step 1)

With a trigger, the central control means 302 starts a system update flow F6000. The trigger is initiated by receiving a system update signal input from the manager. Further, an update of the virtual resource space information 2300 may be assumed to be a trigger.

(Step 2)

The central control means 302 transmits a resource information update command to the virtual resource management means 306.

(Step 3)

After the virtual resource management means 306, upon receipt of the update command, updates the virtual resource space information 2200 on the database 307 into newest one, it notifies completion of the update to the central control means 302.

(Step 4)

Figure 9:
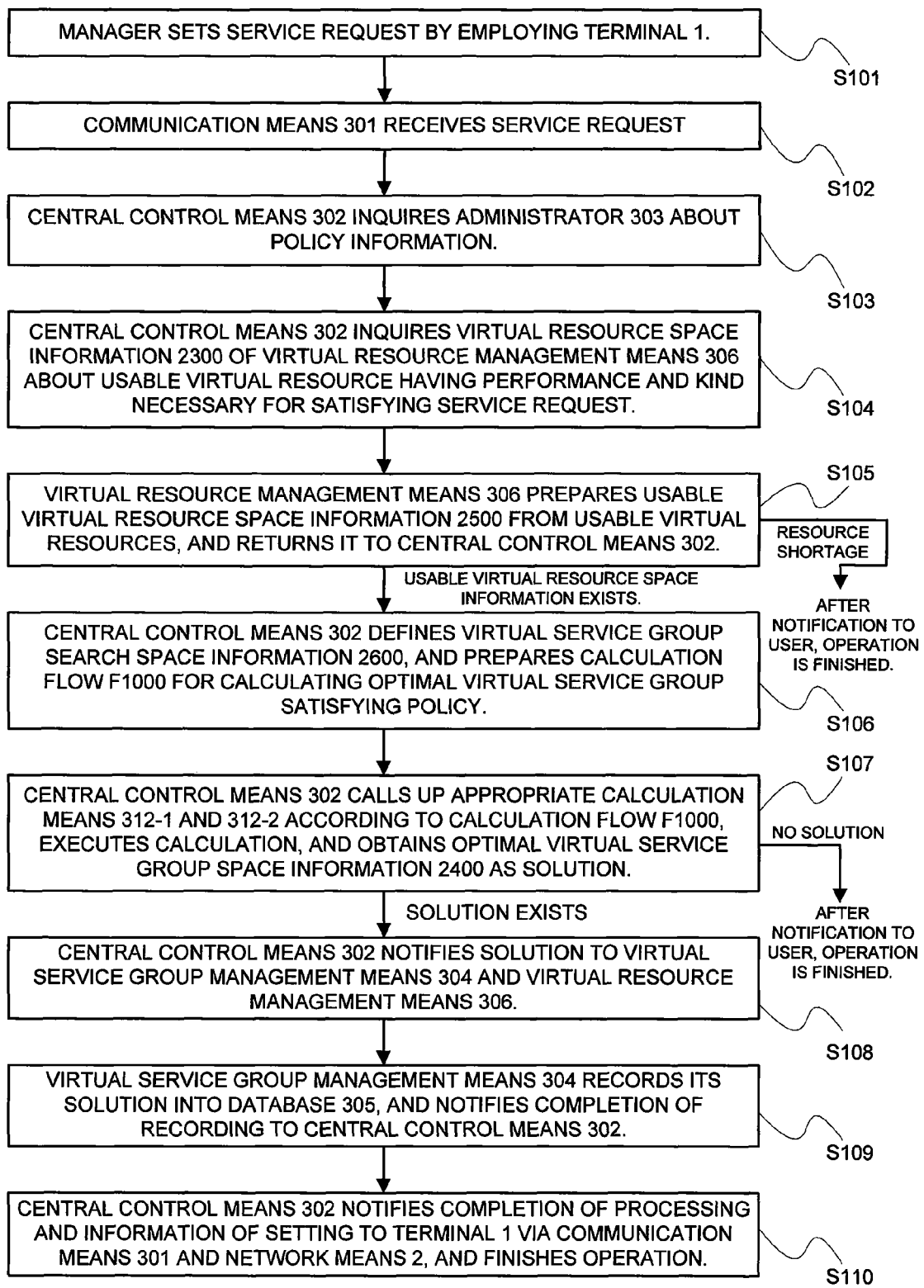
FIG. 9 is a flowchart illustrating an entire operation in the example 1.

After notifying the completion of the update, the steps S103 to S110 described in FIG. 9 are executed.

Figure 10:
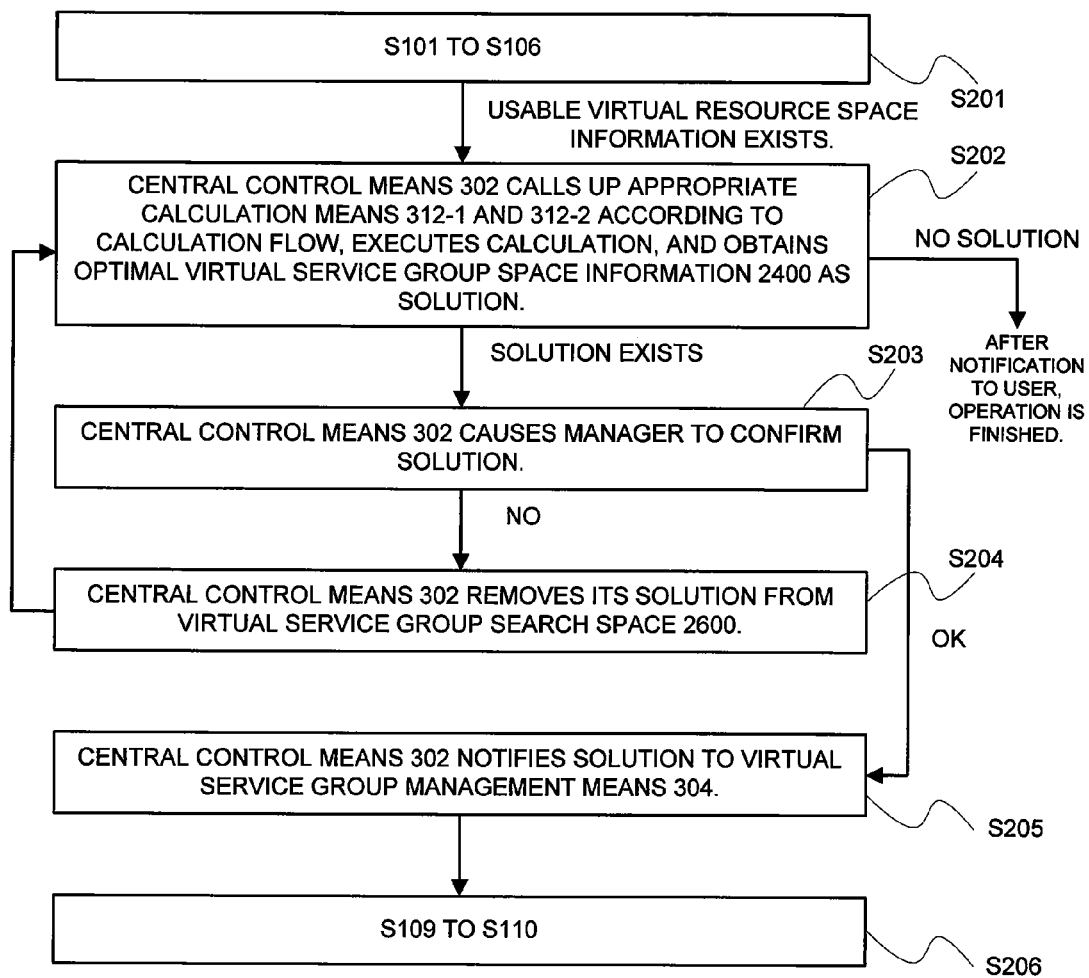
FIG. 10 is a flowchart illustrating an operation including particularly a manager's confirmation of the setting in the entire operation in the example 1.

Herein, in a case of executing the steps after a manager's confirmation, it is also possible to perform the setting according to the flow of FIG. 10 instead of the flow of FIG. 9.

Next, effects of the present invention will be explained.

Figure 18:
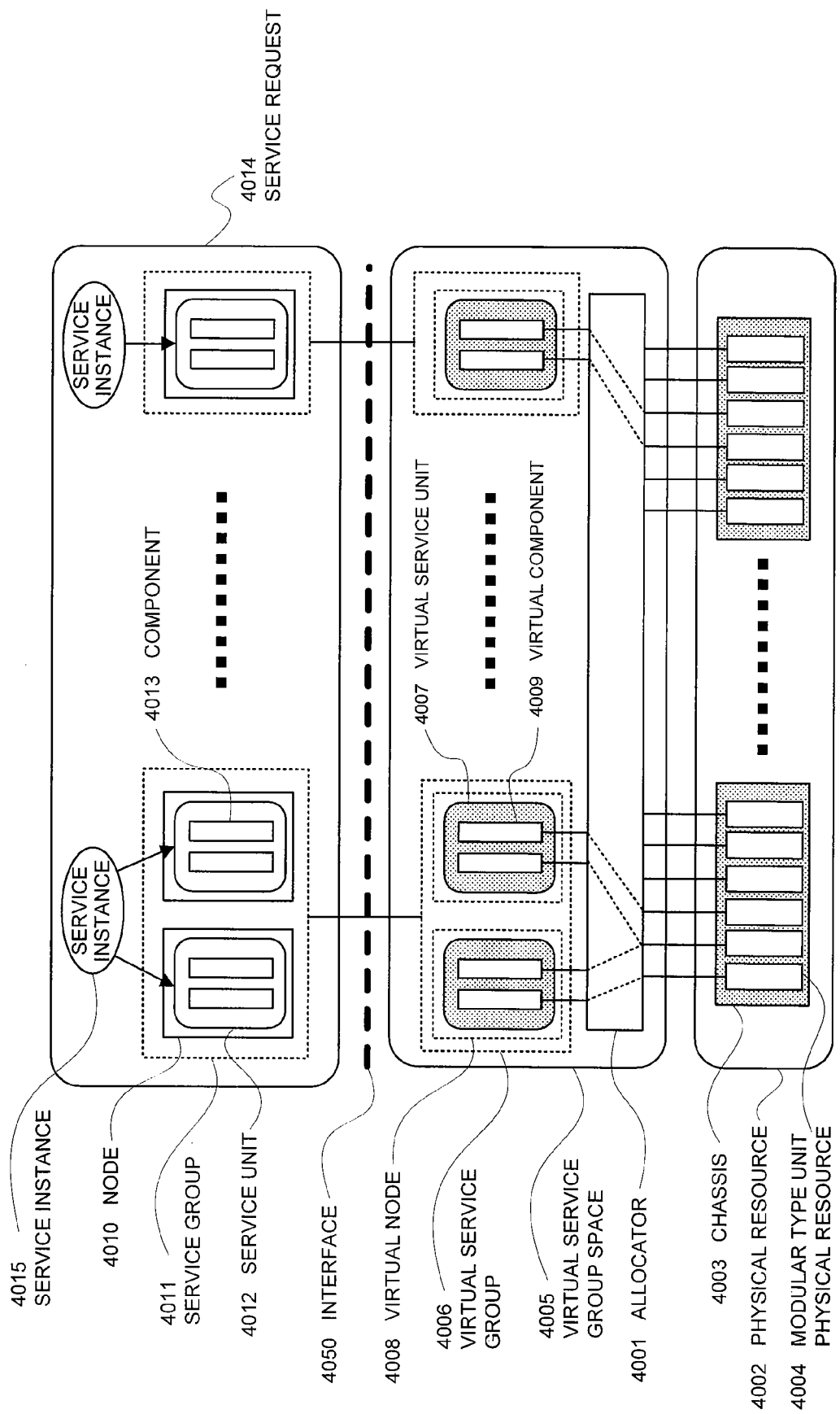
FIG. 18 is a schematic view of a use example for explaining the effect of the example 1.

In the best mode for carrying out the present invention, as shown in FIG. 18, in selecting the physical resources, the manger designates only a logical configuration without paying attention to its risk and fragment, thereby enabling the service to set automatically.

The effect of the present invention logically lies in a point that, responding to the manager performing a service setting, it is possible to define an interface 4050, to define the virtual service group space 4005 for the service request 4014, to provide the virtual service group 4006, the virtual service unit 4007, the virtual component 4009, and the virtual node 4008 that correspond to the service group 4011, the service unit 4012, the component 4013, and the node 4010 within the service request 4014, to perform the risk management or the fragment management, and to assign modular type unit physical resources 4004 within an optimal physical resources 4002 to the virtual service unit 4007 within the virtual service group 4006 within the service group space 4005, and the virtual component 4009 constituting the virtual service unit 4007 by employing an allocator 4001.

With this, in setting the service, in a case where an alteration to the system exists, or the like, the manager can perform the automatic optimal setting without paying attention to optimization of the risk or fragment.

Figure 19:
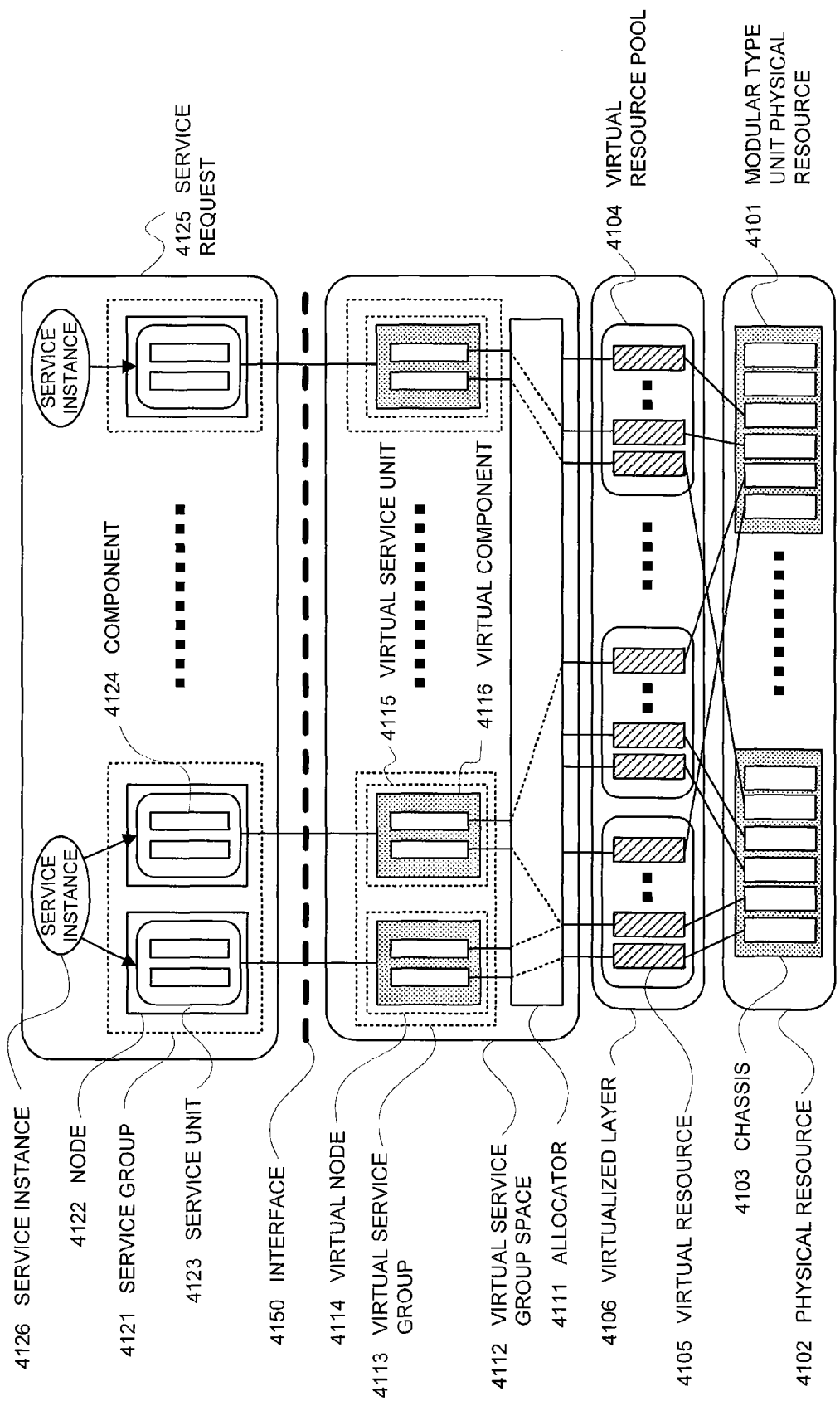
FIG. 19 is a schematic view for explaining the effect of the case of having applied the example 1 to the case that a virtualized layer exists already.
Figure 20:
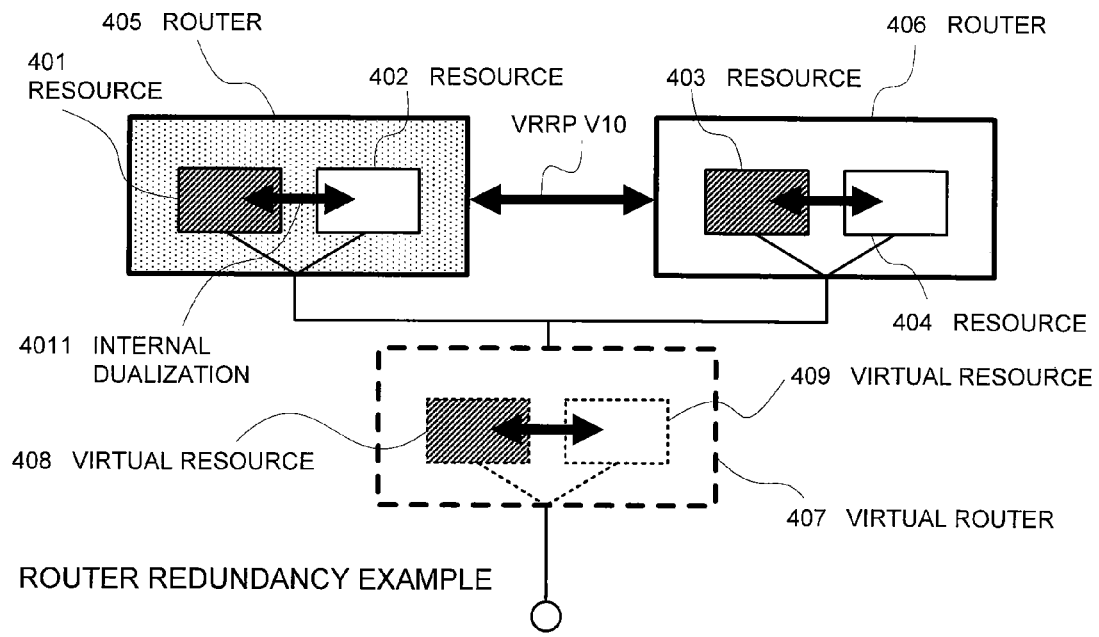
FIG. 20 is an example of redundancy employing the conventional VRRP by the router.
Figure 21:
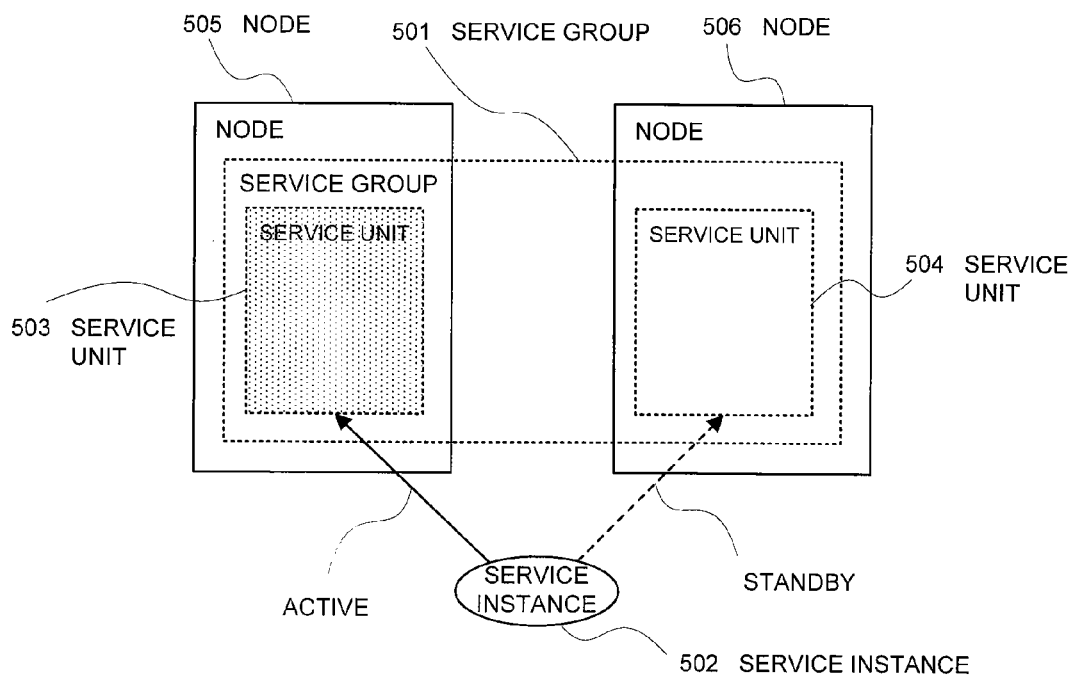
FIG. 21 is an example of incorporating a configuration of 2N (N=1) redundancy on different nodes.
Figure 22:
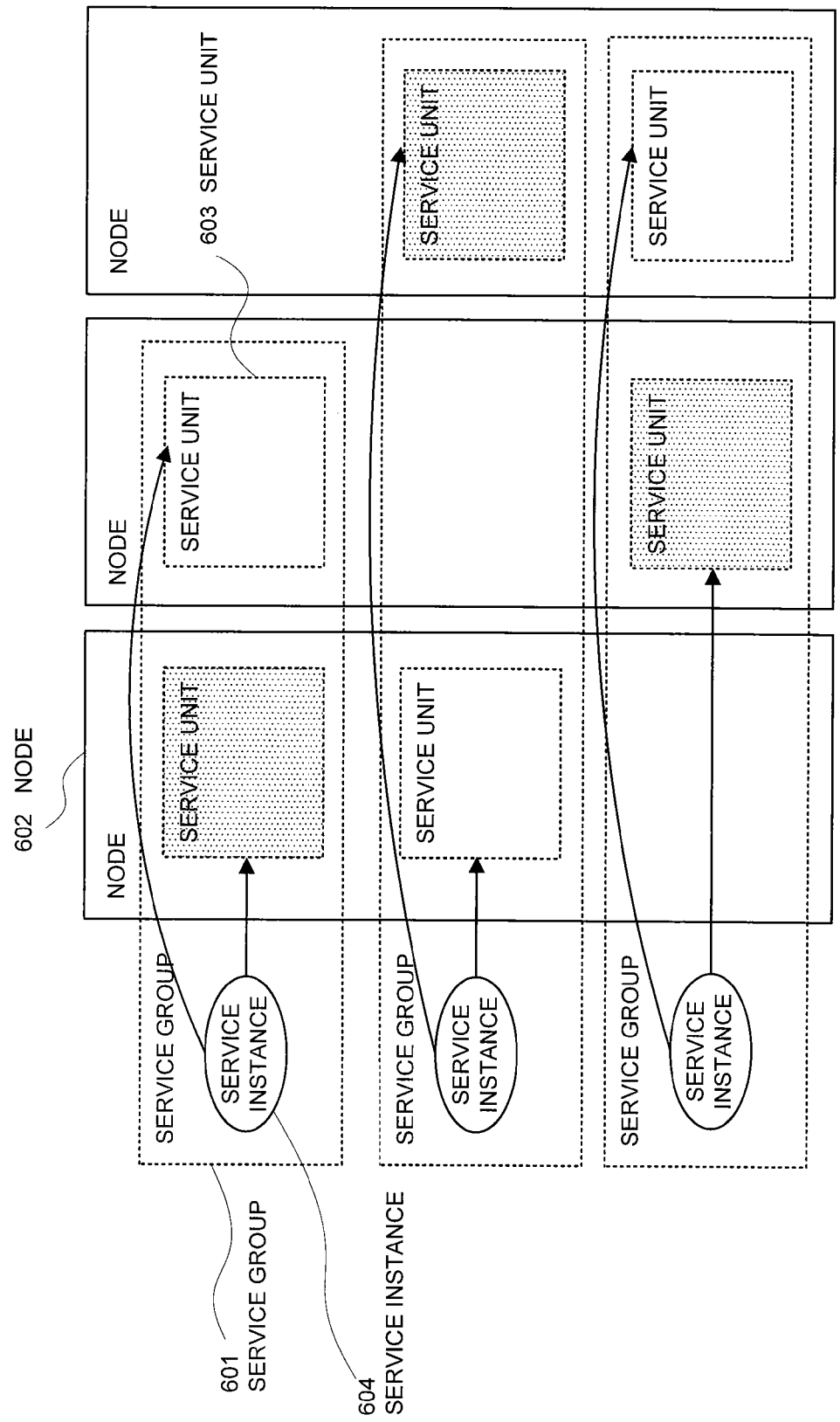
FIG. 22 is an example in which a configuration of 2N (N=3) redundancy is incorporated on different nodes, and an "active" service and a "standby" service unit are incorporated on each node.
Figure 23:
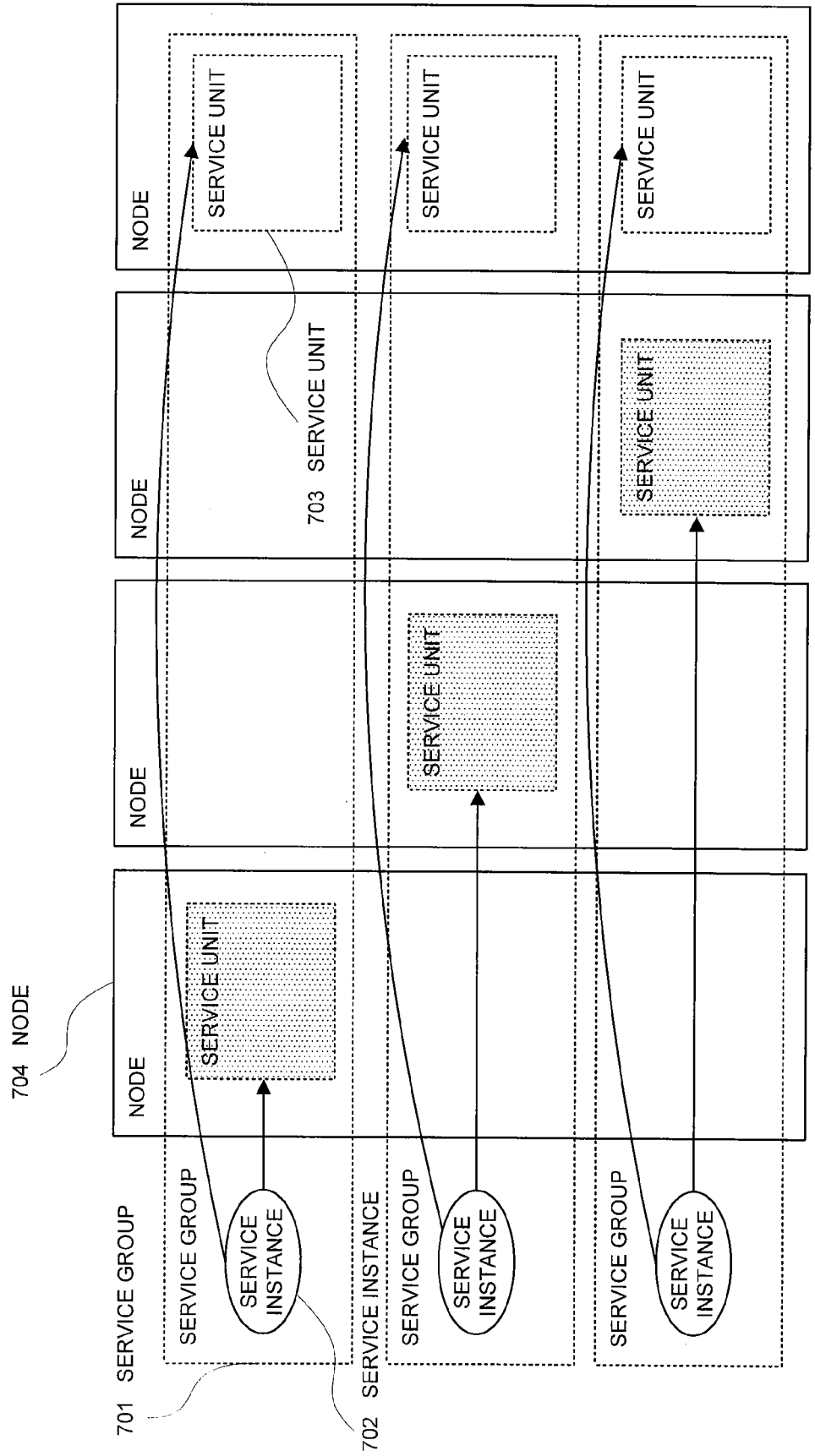
FIG. 23 is an example in which a configuration of 2N (N=3) redundancy is incorporated on different nodes, and one node is exclusively dedicated for the "standby" service units.
Figure 24:
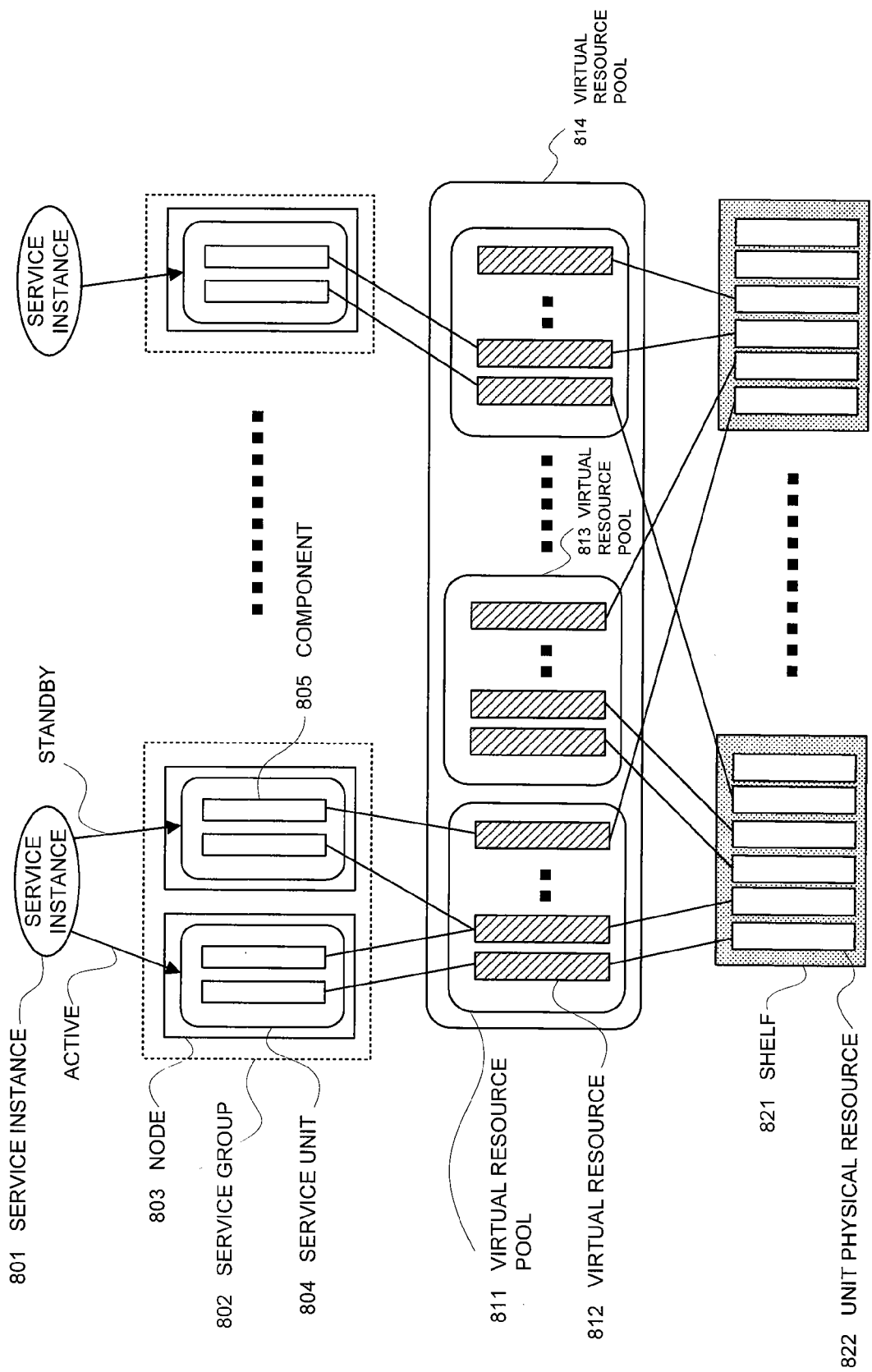
FIG. 24 is an example in which the physical resources are virtualized in the system that is configured of the platform devices such as a plurality of shells having the conventional modular type unit physical resources mounted, and a redundant configuration is incorporated on it.
Figure 25:
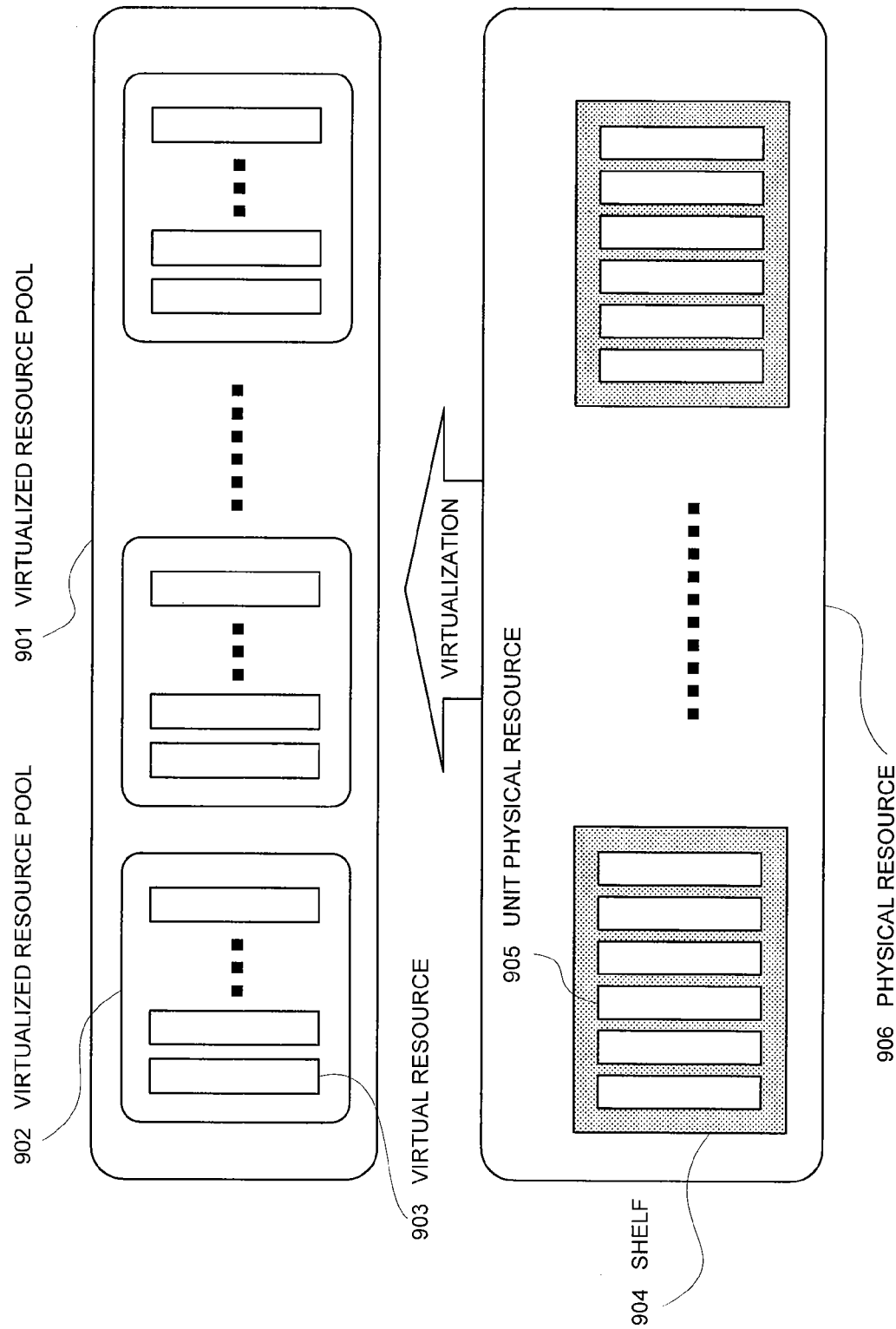
FIG. 25 is an example of virtualizing the physical resources in the system that is configured of the platform devices such as a plurality of shells having the conventional modular type unit physical resources mounted.

For the service request 4014 made via the interface 4050, by similarly assigning the provided virtual service group 4006, virtual service unit 4007, virtual component 4009, and virtual node 4008, and the virtual resource 4105 on the virtualized layer 4106 to the system as well including a virtualization layer 4106 having a virtual resource pool 4104 prepared, which has been classified with the performance and kind of the resource, and includes a virtual resource 4105, with an allocator 4111 as shown in FIG. 19, the similar effect can be attained.

HOW THE INVENTION IS CAPABLE OF INDUSTRIAL EXPLOITATION

The present invention is applicable to fields such as the service setting/management of a network device, a computer device, etc. in a large-scale management system including a plurality of the platforms having a plurality of the modular type unit physical resources mounted, and its program.

The invention claimed is:

1. An information processing device, comprising:
storage that files component information on components for constituting a plurality of service units, each of which satisfies a predetermined function required for a service; and
a processor that calculates a combination of the components necessary for constituting a system required for a service based upon said component information, calculates risk information, being information on a risk that a physical failure affects a service request, and/or fragment information, representing a dispersed degree indicating that the components of the service unit are dispersedly allocated over a plurality of physical shelves, and ranks the selected combinations of the components based upon a predetermined policy, the calculated risk information, and/or fragment information, wherein
said processor calculates a statistic of the risk in each combination of the components as the risk information, and
said processor calculates an average and/or a variance, being a statistic of the risk in each combination of the components, as the risk information.

2. The information processing device according to claim 1, characterized in that the component information that is filed into said storage is information of a physical resource.

3. The information processing device according to claim 1, characterized in that:
the component information that is filed into said storage means is comprised of physical resource information of the physical resource, and virtualized resource information of a virtualized resource that is obtained by virtualizing and componentizing said physical resource, said virtualized resource information being caused to relate to said physical resource information; and
said processor calculates a combination of the components with one virtualized resource assumed to be one component.

4. An information processing device comprising:
storage that files component information on components for constituting a plurality of service units, each of which satisfies a predetermined function required for a service; and
a processor that calculates a combination of the components necessary for constituting a system required for a service based upon said component information, calculates risk information, being information on a risk that a physical failure affects a service request, and/or fragment information, representing a dispersed degree indicating that the components of the service unit are dispersedly allocated over a plurality of physical shelves, and ranks the selected combinations of the components based upon a predetermined policy, the calculated risk information, and/or fragment information, wherein
said processor calculates a statistic of the fragment in each combination of the components as the fragment information, and
said processor calculates an average and/or a variance, being a statistic of the fragment in each combination of the components, as the fragment information.

5. A computer readable medium storing instructions for performing a method of selecting components by a computer, said method comprising:
calculating a combination of components necessary for constituting a plurality of service units, each of which satisfies a predetermined function required for a service; and
calculating risk information, being information on a risk that a physical failure affects a service request, and/or fragment information, representing a dispersed degree indicating that the components of the service unit are dispersedly allocated over a plurality of physical shelves, for this combination of the components, and ranking the selected combinations of the components based upon a predetermined policy, the calculated risk information, and/or fragment information, wherein
the risk information is a statistic of the risk in each combination of the components, and
the risk information is an average and/or a variance, being a statistic of the risk in each combination of the components.

6. The computer readable medium of claim 5, wherein said component is a physical resource.

7. The computer readable medium of claim 5, wherein said component is a resource that is obtained by virtualizing the physical resource.

8. A computer readable medium storing instructions for performing a method of selecting components by a computer, said method comprising:
calculating a combination of components necessary for constituting a plurality of service units, each of which satisfies a predetermined function required for a service; and
calculating risk information, being information on a risk that a physical failure affects a service request, and/or fragment information, representing a dispersed degree indicating that the components of the service unit are dispersedly allocated over a plurality of physical shelves, for this combination of the components, and ranking the selected combinations of the components based upon a predetermined policy, the calculated risk information, and/or fragment information, wherein
the fragment information is a statistic of the fragment in each combination of the components, and the fragment information is an average and/or a variance, being a statistic of the fragment in each combination of the components.

9. A modular type system operation management system, comprising:
- a physical resource constituting a modular type system, being an object of management, said physical resource being connected to a network;
- a terminal for transmitting information acquisition request data, setting request data, and policy data of a setting item or an operational data item that said physical resource provides, said terminal being connected to the network; and
- a controller connected to the network: comprising:
  - physical resource information, being information of said physical resources;
  - virtual resource information having information extracted of the item for referencing or changing the setting/operational data item that said physical resources provides;
  - information of a virtual service group that is configured of said virtual resources, said information being virtual service group space information having information extracted/processed of the item for referencing or changing the setting/operational data item that said virtual resources provides; and
  - policy information having processing information described in referencing or changing the setting/operational data item that said virtual resources provides; and
  - including means for:
    - making a reply to a request for setting said physical resources or virtual resources that are transmitted from said terminal;
    - calculating a solution by an optimal calculation based upon said virtual resource information and policy information;
    - performing an optimal setting of the virtual resource service group based upon this solution;
    - preparing/managing said virtual service group space information;
    - transmitting it to said terminal, and
    - further transmitting information to said terminal responding to an information acquisition request for each of said information, wherein
  - said controller comprises means for, for said setting request, employing said physical resource information or said virtual resource information to calculate risk information, being information on a risk that a physical failure affects said setting request, and preparing/managing said virtual service group space information,
  - the risk information is a statistic of the risk, and
  - the risk information is an average and/or a variance, being a statistic of the risk.

10. The modular type system operation management system according to claim 9, characterized in that said controller comprises:
- a physical resource information database for filing information of said physical resources;
- physical resource management means for performing managements such as read/write, information update, and monitoring of said physical resource database;
- a virtual resource information database for filing information of said virtual resources;
- virtual resource management means for performing managements such as read/write, information update, and monitoring of said virtual resource database;
- a virtual service group space information database for filing information of said virtual service group space;
- virtual service group management means for performing managements such as read/write, information update, and monitoring of said virtual service group space information database;
- a policy information database for filing information of said policy; and
- policy management means for performing managements such as read/write, information update, and monitoring of said policy information database.

11. The modular type system operation management system according to claim 9, characterized in that said controller comprises communication means for transmitting/receiving necessary data via the physical resource and the network.

12. The modular type system operation management system according to claim 9, characterized in that:
- said controller comprises:
- means for, at the time of occurrence of the failure, detecting abnormality by receiving an alarm signal from the physical resources, or inspecting a state by periodic signal transmission from the controller; and
- means for notifying said detection of abnormality to said physical resource management means, said virtual resource management means, and said virtual service group management means; and
- said physical resource management means, said virtual resource management means, and said virtual service group management means update information of the database that each of them manages base upon said detection of abnormality.

13. The modular type system operation management system according to claim 9, characterized in that:
- said physical resource management means, said virtual resource management means, and said virtual service group management means update information of the database that each of them manages at the time of altering a system such as additional installation and an alteration;
- said controller comprises means for re-calculating said optimization calculation automatically or with a trigger by a manager's command based upon said updated information, and performing an optimal setting of the virtual service group.

14. A modular type system operation management system, comprising:
- a physical resource constituting a modular type system, being an object of management, said physical resource being connected to a network;
- a terminal for transmitting information acquisition request data, setting request data, and policy data of a setting item or an operational data item that said physical resource provides, said terminal being connected to the network; and
- a controller connected to the network: comprising:
  - physical resource information, being information of said physical resources;
  - virtual resource information having information extracted of the item for referencing or changing the setting/operational data item that said physical resources provides;
  - information of a virtual service group that is configured of said virtual resources, said information being virtual service group space information having information extracted/processed of the item for referencing or changing the setting/operational data item that said virtual resources provides; and policy information having processing information described in referencing or changing the setting/operational data item that said virtual resources provides; and including means for:

make a reply to a request for setting said physical resources or virtual resources that are transmitted from said terminal;

calculating a solution by an optimal calculation based upon said virtual resource information and policy information;

performing an optimal setting of the virtual resource service group based upon this solution;

preparing/managing said virtual service group space information;

transmitting it to said terminal, and further transmitting information to said terminal responding to an information acquisition request for each of said information, wherein said controller comprises means for, for said setting request, employing said physical resource information or said virtual resource information to calculate fragment information, being a deflection degree of a use situation of the resources, and preparing/managing said virtual service group space information, the fragment information is a statistic of the fragment, and the fragment information is an average and/or a variance, being a statistic of the fragment.

15. A component selection method of selecting components, comprising:

calculating a combination of the components necessary for a plurality of service units, each of which satisfies a predetermined function required for a service;

calculating risk information, being information on a risk that a physical failure affects a service request, and/or fragment information, representing a dispersed degree indicating that the components of the service unit are dispersedly allocated over a plurality of physical shelves; and ranking the selected combinations of the components based upon a predetermined policy, the calculated risk information, and/or fragment information, wherein the risk information is a statistic of the risk and/or the fragment information is a statistic of the fragment in each combination of the components, and the risk information and/or the fragment information is an average and/or a variance, being a statistic of the risk in each combination of the components.

* * * * *